US012053791B2

(12) United States Patent
Belongia et al.

(10) Patent No.: US 12,053,791 B2
(45) Date of Patent: Aug. 6, 2024

(54) IRRIGATION NOZZLE WITH ONE OR MORE GRIT VENTS

(71) Applicant: RAIN BIRD CORPORATION, Azusa, CA (US)

(72) Inventors: David Charles Belongia, Quail Creek, AZ (US); David Eugene Robertson, Glendora, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 17/860,698

(22) Filed: Jul. 8, 2022

(65) Prior Publication Data

US 2022/0339656 A1 Oct. 27, 2022

Related U.S. Application Data

(63) Continuation of application No. 16/409,510, filed on May 10, 2019, now Pat. No. 11,406,999.

(51) Int. Cl.

| | |
|---|---|
| ***B05B 15/52*** | (2018.01) |
| ***B05B 3/04*** | (2006.01) |
| ***B05B 12/00*** | (2018.01) |
| ***B05B 15/525*** | (2018.01) |
| ***B05B 15/58*** | (2018.01) |

(52) U.S. Cl.

CPC ............ *B05B 15/52* (2018.02); *B05B 3/0486* (2013.01); *B05B 12/002* (2013.01); *B05B 15/525* (2018.02); *B05B 15/58* (2018.02)

(58) Field of Classification Search

CPC .. B05B 15/52; B05B 15/525; B05B 583/0486

See application file for complete search history.

(56) References Cited

U.S. PATENT DOCUMENTS

| | | | |
|---|---|---|---|
| 458,607 | A | 9/1891 | Weiss |
| 1,286,333 | A | 12/1918 | Johnson |
| 1,432,386 | A | 10/1922 | Ctjkwey |

(Continued)

FOREIGN PATENT DOCUMENTS

| | | |
|---|---|---|
| AU | 783999 | 1/2006 |
| CA | 2427450 | 6/2004 |

(Continued)

OTHER PUBLICATIONS

USPTO; U.S. Appl. No. 16/409,510; Office Action mailed Feb. 4, 2021; (pp. 1-10).

(Continued)

*Primary Examiner* — Joseph A Greenlund

(74) *Attorney, Agent, or Firm* — Fitch, Even, Tabin & Flannery, LLP

(57) ABSTRACT

An irrigation nozzle is provided with a grit diversion feature to divert grit away from the interior of the nozzle. The nozzle includes a pattern template that defines the irrigation pattern produced by the nozzle. The pattern template includes one or more flow channels that may be susceptible to clogging with grit. The grit diversion feature includes one or more grit vents to redirect grit away from the interior of the nozzle and may further include an inner wall about the central hub that helps protect the central hub from intrusion by grit.

23 Claims, 16 Drawing Sheets

(56) References Cited

U.S. PATENT DOCUMENTS

| | | | | | |
|---|---|---|---|---|---|
| 1,020,937 | A | * | 3/1923 | Watwick | B05B 1/265 261/DIG. 14 |
| 1,523,609 | A | | 1/1925 | Roach | |
| 1,989,013 | A | * | 1/1935 | Levene | B05B 1/265 239/122 |
| 2,075,589 | A | | 3/1937 | Munz | |
| 2,125,863 | A | | 8/1938 | Arbogast | |
| 2,125,978 | A | | 8/1938 | Arbogast | |
| 2,128,552 | A | | 8/1938 | Rader | |
| 2,130,810 | A | | 9/1938 | Munz | |
| 2,325,280 | A | | 7/1943 | Scherrer | |
| 2,348,776 | A | | 5/1944 | Bentley | |
| 2,634,163 | A | | 4/1953 | Double | |
| 2,723,879 | A | | 11/1955 | Martin | |
| 2,785,013 | A | | 3/1957 | Stearns | |
| 2,875,783 | A | | 3/1959 | Schippers | |
| 2,914,257 | A | | 11/1959 | Wiant | |
| 2,935,266 | A | | 5/1960 | Coleondro | |
| 2,990,123 | A | | 6/1961 | Hyde | |
| 2,990,128 | A | | 6/1961 | Erling | |
| 3,005,593 | A | | 10/1961 | Smith | |
| 3,029,030 | A | | 4/1962 | Dey, Sr. | |
| 3,030,032 | A | | 4/1962 | Juhman, Jr. | |
| 3,109,591 | A | | 11/1963 | Moen | |
| 3,239,149 | A | | 3/1966 | Lindberg, Jr. | |
| 3,380,659 | A | | 4/1968 | Seablom | |
| 3,386,662 | A | | 6/1968 | Kennedy | |
| 3,752,403 | A | | 8/1973 | Van Diest | |
| 3,854,664 | A | | 12/1974 | Hunter | |
| 3,955,764 | A | | 5/1976 | Phaup | |
| 3,979,066 | A | | 9/1976 | Fortner | |
| 4,026,471 | A | | 5/1977 | Hunter | |
| 4,067,497 | A | | 1/1978 | Cornelius | |
| 4,099,675 | A | | 7/1978 | Wohler | |
| 4,119,275 | A | | 10/1978 | Hunter | |
| 4,121,769 | A | | 10/1978 | Drori | |
| 4,131,234 | A | | 12/1978 | Pescetto | |
| 4,189,099 | A | | 2/1980 | Bruninga | |
| 4,198,000 | A | | 4/1980 | Hunter | |
| 4,253,608 | A | | 3/1981 | Hunter | |
| 4,272,024 | A | | 6/1981 | Kah | |
| 4,316,579 | A | | 2/1982 | Ray | |
| 4,353,506 | A | | 10/1982 | Hayes | |
| 4,353,507 | A | | 10/1982 | Kah | |
| 4,398,666 | A | | 8/1983 | Hunter | |
| 4,417,691 | A | | 11/1983 | Lockwood | |
| 4,456,181 | A | | 6/1984 | Burnham | |
| 4,471,908 | A | | 9/1984 | Hunter | |
| 4,479,611 | A | | 10/1984 | Galvis | |
| 4,501,391 | A | | 2/1985 | Hunter | |
| 4,566,632 | A | | 1/1986 | Sesser | |
| 4,568,024 | A | | 2/1986 | Hunter | |
| 4,579,284 | A | | 4/1986 | Arnold | |
| 4,579,285 | A | | 4/1986 | Hunter | |
| 4,609,146 | A | | 9/1986 | Walto | |
| 4,618,100 | A | | 10/1986 | White | |
| 4,624,412 | A | | 11/1986 | Hunter | |
| 4,625,917 | A | | 12/1986 | Torney | |
| RE32,386 | E | | 3/1987 | Hunter | |
| 4,660,766 | A | | 4/1987 | Nelson | |
| 4,669,663 | A | | 6/1987 | Meyer | |
| 4,676,438 | A | | 6/1987 | Sesser | |
| 4,681,260 | A | | 7/1987 | Cochran | |
| 4,681,263 | A | | 7/1987 | Cockman | |
| 4,682,732 | A | | 7/1987 | Walto | |
| 4,699,321 | A | | 10/1987 | Bivens | |
| 4,708,291 | A | | 11/1987 | Grundy | |
| 4,711,399 | A | | 12/1987 | Rosenberg | |
| 4,718,605 | A | | 1/1988 | Hunter | |
| 4,720,045 | A | | 1/1988 | Meyer | |
| 4,739,394 | A | | 4/1988 | Oda | |
| 4,739,934 | A | | 4/1988 | Gewelber | |
| D296,464 | S | | 6/1988 | Marmol | |
| 4,752,031 | A | | 6/1988 | Merrick | |
| 4,760,958 | A | | 8/1988 | Greenberg | |
| 4,763,838 | A | | 8/1988 | Holcomb | |
| 4,783,004 | A | | 11/1988 | Lockwood | |
| 4,784,325 | A | | 11/1988 | Walker | |
| 4,796,809 | A | | 1/1989 | Hunter | |
| 4,796,811 | A | | 1/1989 | Davisson | |
| 4,815,662 | A | | 3/1989 | Hunter | |
| 4,834,289 | A | | 5/1989 | Hunter | |
| 4,836,449 | A | | 6/1989 | Hunter | |
| 4,836,450 | A | | 6/1989 | Hunter | |
| 4,840,312 | A | | 6/1989 | Tyler | |
| 4,842,201 | A | | 6/1989 | Hunter | |
| 4,867,378 | A | | 9/1989 | Kah | |
| 4,898,332 | A | | 2/1990 | Hunter | |
| 4,901,924 | A | | 2/1990 | Kah | |
| 4,932,590 | A | | 6/1990 | Hunter | |
| 4,944,456 | A | | 7/1990 | Zakai | |
| 4,948,052 | A | | 8/1990 | Hunter | |
| 4,955,542 | A | | 9/1990 | Kah | |
| 4,957,240 | A | | 9/1990 | Rosenberg | |
| 4,961,534 | A | | 10/1990 | Tyler | |
| 4,967,961 | A | | 11/1990 | Hunter | |
| 4,971,250 | A | | 11/1990 | Hunter | |
| 4,971,256 | A | | 11/1990 | Malcolm | |
| D312,865 | S | | 12/1990 | Davisson | |
| 4,986,474 | A | | 1/1991 | Schisler | |
| 5,009,368 | A | | 4/1991 | Streck | |
| 5,031,840 | A | | 7/1991 | Grundy | |
| 5,050,800 | A | | 9/1991 | Lamar | |
| 5,052,621 | A | | 10/1991 | Katzer | |
| 5,058,806 | A | | 10/1991 | Rupar | |
| 5,078,321 | A | | 1/1992 | Davis | |
| 5,083,709 | A | | 1/1992 | Iwanowski | |
| RE33,823 | E | | 2/1992 | Nelson | |
| 5,086,977 | A | | 2/1992 | Kah | |
| 5,090,619 | A | | 2/1992 | Barthold | |
| 5,098,021 | A | | 3/1992 | Kah | |
| 5,104,045 | A | | 4/1992 | Kah | |
| 5,123,597 | A | | 6/1992 | Bendall | |
| 5,141,024 | A | | 8/1992 | Hicks | |
| 5,148,990 | A | | 9/1992 | Kah | |
| 5,148,991 | A | | 9/1992 | Kah | |
| 5,152,458 | A | | 10/1992 | Curtis | |
| 5,158,232 | A | | 10/1992 | Tyler | |
| 5,174,501 | A | | 12/1992 | Hadar | |
| 5,199,646 | A | | 4/1993 | Kah | |
| 5,205,491 | A | | 4/1993 | Hadar | |
| 5,224,653 | A | * | 7/1993 | Nelson | B05B 3/005 239/222.11 |
| 5,226,599 | A | | 7/1993 | Lindermeir | |
| 5,226,602 | A | | 7/1993 | Cochran | |
| 5,234,169 | A | | 8/1993 | McKenzie | |
| 5,240,182 | A | | 8/1993 | Lemme | |
| 5,240,184 | A | | 8/1993 | Lawson | |
| 5,267,689 | A | | 12/1993 | Forer | |
| 5,288,022 | A | | 2/1994 | Sesser | |
| 5,297,737 | A | | 3/1994 | Davisson | |
| 5,299,742 | A | | 4/1994 | Han | |
| 5,307,993 | A | | 5/1994 | Simonetti | |
| 5,322,223 | A | | 6/1994 | Hadar | |
| 5,335,857 | A | | 8/1994 | Hagon | |
| 5,360,167 | A | | 11/1994 | Grundy | |
| 5,370,311 | A | | 12/1994 | Chen | |
| 5,372,307 | A | | 12/1994 | Sesser | |
| 5,375,768 | A | | 12/1994 | Clark | |
| 5,377,914 | A | | 1/1995 | Christen | |
| 5,398,872 | A | | 3/1995 | Joubran | |
| 5,415,348 | A | | 5/1995 | Nelson | |
| 5,417,370 | A | | 5/1995 | Kah | |
| 5,423,486 | A | | 6/1995 | Hunter | |
| 5,435,490 | A | | 7/1995 | Machut | |
| 5,439,174 | A | | 8/1995 | Sweet | |
| RE35,037 | E | | 9/1995 | Kah | |
| 5,456,411 | A | | 10/1995 | Scott | |
| 5,503,139 | A | | 4/1996 | McMahon | |
| 5,526,982 | A | | 6/1996 | McKenzie | |
| 5,544,814 | A | | 8/1996 | Spenser | |
| 5,556,036 | A | | 9/1996 | Chase | |
| 5,588,594 | A | | 12/1996 | Kah | |
| 5,588,595 | A | | 12/1996 | Sweet | |

(56) References Cited

U.S. PATENT DOCUMENTS

| | | | | |
|---|---|---|---|---|
| 5,598,977 | A | 2/1997 | Lemme | |
| 5,611,488 | A | 3/1997 | Frolich | |
| 5,620,141 | A | 4/1997 | Chiang | |
| 5,640,983 | A | 6/1997 | Sherman | |
| 5,642,861 | A * | 7/1997 | Ogi | B05B 1/262 239/553 |
| 5,653,390 | A | 8/1997 | Kah | |
| 5,662,545 | A | 9/1997 | Zimmerman | |
| 5,669,449 | A | 9/1997 | Polan | |
| 5,671,885 | A | 9/1997 | Davisson | |
| 5,671,886 | A | 9/1997 | Sesser | |
| 5,676,315 | A | 10/1997 | Han | |
| D388,502 | S | 12/1997 | Kah | |
| 5,695,123 | A | 12/1997 | Van Le | |
| 5,699,962 | A | 12/1997 | Scott | |
| 5,711,486 | A | 1/1998 | Clark | |
| 5,718,381 | A | 2/1998 | Katzer | |
| 5,720,435 | A | 2/1998 | Hunter | |
| 5,722,593 | A | 3/1998 | McKenzie | |
| 5,758,827 | A | 6/1998 | Van Le | |
| 5,762,270 | A | 6/1998 | Kearby | |
| 5,765,757 | A | 6/1998 | Bendall | |
| 5,765,760 | A | 6/1998 | Kuo | |
| 5,769,322 | A | 6/1998 | Smith | |
| 5,785,248 | A | 7/1998 | Staylor | |
| 5,820,029 | A | 10/1998 | Marans | |
| 5,823,439 | A | 10/1998 | Hunter | |
| 5,823,440 | A | 10/1998 | Clark | |
| 5,826,797 | A | 10/1998 | Kah | |
| 5,845,849 | A | 12/1998 | Mitzlaff | |
| 5,875,969 | A | 3/1999 | Grundy | |
| 5,918,812 | A | 7/1999 | Beutler | |
| 5,927,607 | A | 7/1999 | Scott | |
| 5,971,297 | A | 10/1999 | Sesser | |
| 5,988,523 | A | 11/1999 | Scott | |
| 5,992,760 | A | 11/1999 | Kearby | |
| 6,007,001 | A | 12/1999 | Hilton | |
| 6,019,295 | A | 2/2000 | McKenzie | |
| 6,029,907 | A | 2/2000 | McKenzie | |
| 6,042,021 | A | 3/2000 | Clark | |
| 6,050,502 | A | 4/2000 | Clark | |
| 6,059,044 | A | 5/2000 | Fischer | |
| 6,076,744 | A | 6/2000 | O'Brien | |
| 6,076,747 | A | 6/2000 | Ming-Yuan | |
| 6,085,995 | A | 7/2000 | Kah | |
| 6,092,739 | A | 7/2000 | Clearman | |
| 6,102,308 | A | 8/2000 | Steingass | |
| 6,109,545 | A | 8/2000 | Kah | |
| 6,135,364 | A | 10/2000 | Nickish | |
| 6,138,924 | A | 10/2000 | Hunter | |
| 6,142,386 | A | 11/2000 | Spenser | |
| 6,145,758 | A | 11/2000 | Ogi | |
| 6,155,493 | A | 12/2000 | Kearby | |
| 6,158,675 | A | 12/2000 | Ogi | |
| 6,182,909 | B1 | 2/2001 | Kah | |
| 6,186,413 | B1 | 2/2001 | Lawson | |
| 6,223,999 | B1 | 5/2001 | Lemelshtrich | |
| 6,227,455 | B1 | 5/2001 | Scott | |
| 6,230,988 | B1 | 5/2001 | Chao | |
| 6,230,989 | B1 | 5/2001 | Haverstraw | |
| 6,237,862 | B1 | 5/2001 | Kah | |
| 6,241,158 | B1 | 6/2001 | Clark | |
| 6,244,521 | B1 | 6/2001 | Sesser | |
| 6,254,013 | B1 | 7/2001 | Clearman | |
| 6,264,117 | B1 | 7/2001 | Roman | |
| 6,276,460 | B1 | 8/2001 | Pahila | |
| 6,286,767 | B1 | 9/2001 | Hui-Chen | |
| 6,332,581 | B1 | 12/2001 | Chin | |
| 6,336,597 | B1 | 1/2002 | Kah | |
| 6,341,733 | B1 | 1/2002 | Sweet | |
| 6,345,541 | B1 | 2/2002 | Hendey | |
| 6,367,708 | B1 | 4/2002 | Olson | |
| D458,342 | S | 6/2002 | Johnson | |
| D458,554 | S | 6/2002 | Jolly | |
| 6,443,372 | B1 | 9/2002 | Hsu | |
| 6,454,186 | B2 | 9/2002 | Haverstraw | |
| 6,457,656 | B1 | 10/2002 | Scott | |
| 6,464,151 | B1 | 10/2002 | Cordua | |
| 6,478,237 | B2 | 11/2002 | Kearby | |
| 6,481,644 | B1 | 11/2002 | Olsen | |
| 6,488,218 | B1 | 12/2002 | Townsend | |
| 6,491,235 | B1 | 12/2002 | Scott | |
| 6,494,384 | B1 | 12/2002 | Meyer | |
| 6,499,672 | B1 | 12/2002 | Sesser | |
| 6,516,893 | B2 | 2/2003 | Pahila | |
| 6,530,531 | B2 | 3/2003 | Butler | |
| 6,601,781 | B2 | 8/2003 | Kah | |
| 6,607,147 | B2 | 8/2003 | Schneider | |
| 6,622,940 | B2 | 9/2003 | Huang | |
| 6,637,672 | B2 | 10/2003 | Cordua | |
| 6,651,904 | B2 | 11/2003 | Roman | |
| 6,651,905 | B2 | 11/2003 | Sesser | |
| 6,688,539 | B2 | 2/2004 | Vander Griend | |
| 6,695,223 | B2 | 2/2004 | Beutler | |
| 6,715,699 | B1 | 4/2004 | Greenberg | |
| 6,719,218 | B2 | 4/2004 | Cool | |
| 6,732,950 | B2 | 5/2004 | Ingham, Jr. | |
| 6,732,952 | B2 | 5/2004 | Kah | |
| 6,736,332 | B2 | 5/2004 | Sesser | |
| 6,736,336 | B2 | 5/2004 | Wong | |
| 6,737,332 | B1 | 5/2004 | Fuselier | |
| 6,769,633 | B1 | 8/2004 | Huang | |
| 6,793,152 | B1 | 9/2004 | Drechsel | |
| 6,814,304 | B2 | 11/2004 | Onofrio | |
| 6,814,305 | B2 | 11/2004 | Townsend | |
| 6,817,543 | B2 | 11/2004 | Clark | |
| 6,820,825 | B1 | 11/2004 | Wang | |
| 6,827,291 | B2 | 12/2004 | Townsend | |
| 6,834,816 | B2 | 12/2004 | Kah, Jr. | |
| 6,840,460 | B2 | 1/2005 | Clark | |
| 6,848,632 | B2 | 2/2005 | Clark | |
| 6,854,664 | B2 | 2/2005 | Smith | |
| 6,869,026 | B2 | 3/2005 | McKenzie | |
| 6,871,795 | B2 | 3/2005 | Anuskiewicz | |
| 6,880,768 | B2 | 4/2005 | Lau | |
| 6,883,727 | B2 | 4/2005 | De Los Santos | |
| 6,899,287 | B2 | 5/2005 | Pinch | |
| 6,921,030 | B2 | 7/2005 | Renquist | |
| 6,942,164 | B2 | 9/2005 | Walker | |
| 6,945,471 | B2 | 9/2005 | McKenzie | |
| 6,957,782 | B2 | 10/2005 | Clark | |
| 6,976,543 | B1 | 12/2005 | Fischer | |
| 6,997,393 | B1 | 2/2006 | Angold | |
| 7,017,831 | B2 | 3/2006 | Santiago | |
| 7,017,837 | B2 | 3/2006 | Taketomi | |
| 7,028,920 | B2 | 4/2006 | Hekman | |
| 7,028,927 | B2 | 4/2006 | Mermet | |
| 7,032,836 | B2 | 4/2006 | Sesser | |
| 7,032,844 | B2 | 4/2006 | Cordua | |
| 7,040,553 | B2 | 5/2006 | Clark | |
| 7,044,403 | B2 | 5/2006 | Kah | |
| 7,070,122 | B2 | 7/2006 | Burcham | |
| 7,090,146 | B1 | 8/2006 | Ericksen | |
| 7,100,842 | B2 | 9/2006 | Meyer | |
| 7,104,472 | B2 | 9/2006 | Renquist | |
| 7,111,795 | B2 | 9/2006 | Thong | |
| 7,143,957 | B2 | 12/2006 | Nelson | |
| 7,143,962 | B2 | 12/2006 | Kah, Jr. | |
| 7,152,814 | B1 | 12/2006 | Schapper | |
| 7,156,322 | B1 | 1/2007 | Heitzman | |
| 7,159,795 | B2 | 1/2007 | Sesser | |
| 7,168,634 | B2 | 1/2007 | Onofrio | |
| 7,232,078 | B2 | 6/2007 | Kah, Jr. | |
| 7,232,081 | B2 | 6/2007 | Kah | |
| 7,234,651 | B2 | 6/2007 | Mousavi | |
| 7,240,860 | B2 | 7/2007 | Vander Griend | |
| 7,287,711 | B2 | 10/2007 | Crooks | |
| 7,293,721 | B2 | 11/2007 | Roberts | |
| 7,299,999 | B2 | 11/2007 | Walker | |
| 7,303,147 | B1 | 12/2007 | Danner | |
| 7,303,153 | B2 * | 12/2007 | Han | B05B 1/267 239/203 |
| 7,322,533 | B2 | 1/2008 | Grizzle | |
| 7,337,988 | B2 | 3/2008 | McCormick | |

(56) References Cited

U.S. PATENT DOCUMENTS

| | | | | |
|---|---|---|---|---|
| 7,383,721 | B2 | 6/2008 | Parsons | |
| 7,389,942 | B2 | 6/2008 | Kenyon | |
| RE40,440 | E | 7/2008 | Sesser | |
| 7,392,956 | B2 | 7/2008 | McKenzie | |
| 7,395,977 | B2 | 7/2008 | Pinch | |
| 7,429,005 | B2 | 9/2008 | Schapper | |
| 7,458,527 | B2 | 12/2008 | Lutzki | |
| 7,478,526 | B2 | 1/2009 | McAfee | |
| 7,533,833 | B2 | 5/2009 | Wang | |
| 7,581,687 | B2 | 9/2009 | Feith | |
| 7,584,906 | B2 | 9/2009 | Lev | |
| 7,597,273 | B2 | 10/2009 | McAfee | |
| 7,607,588 | B2 | 10/2009 | Nobili | |
| 7,611,077 | B2 | 11/2009 | Sesser | |
| 7,621,464 | B2 | 11/2009 | Smith | |
| 7,621,467 | B1 | 11/2009 | Garcia | |
| 7,624,935 | B2 | 12/2009 | Nelson | |
| 7,654,474 | B2 | 2/2010 | Cordua | |
| 7,686,235 | B2 | 3/2010 | Roberts | |
| 7,686,236 | B2 | 3/2010 | Alexander | |
| 7,703,706 | B2 | 4/2010 | Walker | |
| D615,152 | S | 5/2010 | Kah | |
| 7,717,361 | B2 | 5/2010 | Nelson | |
| 7,766,259 | B2 | 8/2010 | Feith | |
| 7,789,323 | B2 | 9/2010 | Nelson | |
| 7,819,339 | B2 | 10/2010 | Dieziger | |
| D628,272 | S | 11/2010 | Kah | |
| 7,828,229 | B2 | 11/2010 | Kah | |
| 7,861,948 | B1 | 1/2011 | Crooks | |
| D636,459 | S | 4/2011 | Kah | |
| 7,926,746 | B2 | 4/2011 | Melton | |
| 7,971,804 | B2 | 7/2011 | Roberts | |
| RE42,596 | E | 8/2011 | Sesser | |
| 8,006,919 | B2 | 8/2011 | Renquist | |
| 8,011,602 | B2 | 9/2011 | Coppersmith | |
| 8,047,456 | B2 | 11/2011 | Kah | |
| 8,056,829 | B2 | 11/2011 | Gregory | |
| 8,074,897 | B2 | 12/2011 | Hunnicutt | |
| 8,083,158 | B2 | 12/2011 | Katzman | |
| 8,205,811 | B2 | 6/2012 | Cordua | |
| 8,272,583 | B2 * | 9/2012 | Hunnicutt | B05B 3/003 239/582.1 |
| 8,282,022 | B2 | 10/2012 | Porter | |
| 8,297,533 | B2 | 10/2012 | Dunn | |
| 8,336,788 | B2 * | 12/2012 | Perkins | B05B 3/0486 239/122 |
| 8,408,482 | B2 | 4/2013 | Gregory | |
| 8,567,699 | B2 | 10/2013 | Sesser | |
| 8,651,400 | B2 | 2/2014 | Walker | |
| 8,672,242 | B2 | 3/2014 | Hunnicutt | |
| 8,695,900 | B2 | 4/2014 | Hunnicutt | |
| 8,783,582 | B2 | 7/2014 | Robertson | |
| 8,789,768 | B2 | 7/2014 | Hunnicutt | |
| 8,925,837 | B2 | 1/2015 | Walker | |
| 8,991,724 | B2 | 3/2015 | Sesser | |
| 8,991,726 | B2 | 3/2015 | Kah, Jr. | |
| 8,998,109 | B2 | 4/2015 | Katzman | |
| 9,056,214 | B2 | 6/2015 | Barmoav | |
| 9,079,202 | B2 | 7/2015 | Walker | |
| 9,174,227 | B2 | 11/2015 | Robertson | |
| 9,179,612 | B2 | 11/2015 | Nelson | |
| 9,248,459 | B2 | 2/2016 | Kah, Jr. | |
| 9,295,998 | B2 | 3/2016 | Shadbolt | |
| 9,314,952 | B2 * | 4/2016 | Walker | B05B 1/267 |
| 9,327,297 | B2 * | 5/2016 | Walker | B05B 3/003 |
| 9,387,496 | B2 | 7/2016 | Kah, III | |
| 9,427,751 | B2 * | 8/2016 | Kim | B05B 1/3073 |
| 9,492,832 | B2 | 11/2016 | Kim | |
| 9,504,209 | B2 * | 11/2016 | Kim | A01G 25/00 |
| 9,534,619 | B2 | 1/2017 | Sesser | |
| 9,555,422 | B2 * | 1/2017 | Zhao | B05B 1/08 |
| 9,587,687 | B2 | 3/2017 | Sesser | |
| 9,669,420 | B2 | 6/2017 | Heren | |
| 9,757,743 | B2 | 9/2017 | Kah, Jr. | |
| 9,808,813 | B1 * | 11/2017 | Porter | B05B 3/0422 |
| 9,981,276 | B2 | 5/2018 | Kah, Jr. | |
| 10,183,301 | B2 * | 1/2019 | Orlans | B05B 3/0486 |
| 10,201,818 | B2 | 2/2019 | Duffin | |
| 10,213,802 | B2 | 2/2019 | Kah, Jr. | |
| 10,232,388 | B2 | 3/2019 | Glezerman | |
| 10,232,389 | B1 | 3/2019 | Forrest | |
| 10,239,067 | B2 | 3/2019 | Glezerman | |
| 10,322,422 | B2 | 6/2019 | Simmons | |
| 10,322,423 | B2 * | 6/2019 | Walker | B05B 3/005 |
| 11,247,219 | B2 * | 2/2022 | Walker | B05B 1/3026 |
| 2001/0023901 | A1 | 9/2001 | Haverstraw | |
| 2002/0070289 | A1 | 6/2002 | Hsu | |
| 2002/0130202 | A1 * | 9/2002 | Kah, Jr. | B05B 1/267 239/514 |
| 2002/0139868 | A1 | 10/2002 | Sesser | |
| 2002/0153434 | A1 | 10/2002 | Cordua | |
| 2003/0006304 | A1 | 1/2003 | Cool | |
| 2003/0015606 | A1 | 1/2003 | Cordua | |
| 2003/0042327 | A1 | 3/2003 | Beutler | |
| 2003/0071140 | A1 | 4/2003 | Roman | |
| 2003/0075620 | A1 | 4/2003 | Kah, Jr. | |
| 2004/0108391 | A1 | 6/2004 | Onofrio | |
| 2005/0006501 | A1 | 1/2005 | Englefield | |
| 2005/0161534 | A1 | 7/2005 | Kah | |
| 2005/0194464 | A1 | 9/2005 | Bruninga | |
| 2005/0194479 | A1 | 9/2005 | Curtis | |
| 2005/0199842 | A1 | 9/2005 | Parsons | |
| 2006/0038046 | A1 | 2/2006 | Curtis | |
| 2006/0086832 | A1 | 4/2006 | Roberts | |
| 2006/0086833 | A1 | 4/2006 | Roberts | |
| 2006/0108445 | A1 | 5/2006 | Pinch | |
| 2006/0144968 | A1 | 7/2006 | Lev | |
| 2006/0219815 | A1 | 10/2006 | Hekman | |
| 2006/0237198 | A1 | 10/2006 | Crampton | |
| 2006/0273202 | A1 | 12/2006 | Su | |
| 2006/0281375 | A1 | 12/2006 | Jordan | |
| 2007/0012800 | A1 | 1/2007 | McAfee | |
| 2007/0034711 | A1 | 2/2007 | Kah | |
| 2007/0034712 | A1 | 2/2007 | Kah | |
| 2007/0095935 | A1 * | 5/2007 | Katzman | B05B 3/063 239/204 |
| 2007/0119975 | A1 | 5/2007 | Hunnicutt | |
| 2007/0181711 | A1 | 8/2007 | Sesser | |
| 2007/0235565 | A1 | 10/2007 | Kah | |
| 2007/0246567 | A1 | 10/2007 | Roberts | |
| 2008/0087743 | A1 | 4/2008 | Govrin | |
| 2008/0169363 | A1 | 7/2008 | Walker | |
| 2008/0217427 | A1 | 9/2008 | Wang | |
| 2008/0257982 | A1 | 10/2008 | Kah | |
| 2008/0276391 | A1 | 11/2008 | Jung | |
| 2008/0277499 | A1 | 11/2008 | McAfee | |
| 2009/0001193 | A1 | 1/2009 | Parsons | |
| 2009/0008484 | A1 | 1/2009 | Feith | |
| 2009/0014559 | A1 | 1/2009 | Marino | |
| 2009/0072048 | A1 | 3/2009 | Renquist | |
| 2009/0078788 | A1 | 3/2009 | Holmes | |
| 2009/0108099 | A1 | 4/2009 | Porter | |
| 2009/0140076 | A1 | 6/2009 | Cordua | |
| 2009/0173803 | A1 | 7/2009 | Kah | |
| 2009/0173904 | A1 | 7/2009 | Roberts | |
| 2009/0179165 | A1 | 7/2009 | Parsons | |
| 2009/0188988 | A1 | 7/2009 | Walker | |
| 2009/0224070 | A1 | 9/2009 | Clark | |
| 2010/0090024 | A1 * | 4/2010 | Hunnicutt | B05B 3/021 239/204 |
| 2010/0108787 | A1 * | 5/2010 | Walker | B05B 1/267 239/589 |
| 2010/0176217 | A1 | 7/2010 | Richmond | |
| 2010/0257670 | A1 | 10/2010 | Hodel | |
| 2010/0276512 | A1 | 11/2010 | Nies | |
| 2010/0301135 | A1 * | 12/2010 | Hunnicutt | B05B 3/021 239/443 |
| 2010/0301142 | A1 * | 12/2010 | Hunnicutt | B05B 3/0486 239/457 |
| 2011/0024522 | A1 | 2/2011 | Anuskiewicz | |
| 2011/0031325 | A1 * | 2/2011 | Perkins | B05B 3/0486 239/1 |
| 2011/0089250 | A1 | 4/2011 | Zhao | |
| 2011/0121097 | A1 | 5/2011 | Walker | |

(56) References Cited

U.S. PATENT DOCUMENTS

| | | | | |
|---|---|---|---|---|
| 2011/0147484 | A1 | 6/2011 | Jahan | |
| 2011/0248093 | A1 | 10/2011 | Kim | |
| 2011/0248094 | A1 | 10/2011 | Robertson | |
| 2011/0248097 | A1 | 10/2011 | Kim | |
| 2011/0309161 | A1 | 12/2011 | Renquist | |
| 2011/0309274 | A1 | 12/2011 | Parsons | |
| 2012/0012670 | A1 | 1/2012 | Kah | |
| 2012/0024982 | A1* | 2/2012 | Dunn | B05B 15/55 239/203 |
| 2012/0061489 | A1 | 3/2012 | Hunnicutt | |
| 2012/0153051 | A1 | 6/2012 | Kah | |
| 2012/0292403 | A1 | 11/2012 | Hunnicutt | |
| 2013/0334332 | A1* | 12/2013 | Robertson | B05B 3/021 239/203 |
| 2013/0334340 | A1 | 12/2013 | Walker | |
| 2014/0027526 | A1* | 1/2014 | Shadbolt | B05B 3/0486 239/499 |
| 2014/0027527 | A1* | 1/2014 | Walker | B05B 3/0486 239/499 |
| 2014/0224900 | A1 | 8/2014 | Kim | |
| 2014/0339334 | A1 | 11/2014 | Kah | |
| 2014/0353402 | A1* | 12/2014 | Kah, Jr. | B05B 3/021 239/222.17 |
| 2015/0028128 | A1* | 1/2015 | Kah, Jr. | B05B 1/304 239/225.1 |
| 2015/0224520 | A1 | 8/2015 | Kim | |
| 2016/0107177 | A1 | 4/2016 | Kah, Jr. | |
| 2016/0151795 | A1* | 6/2016 | Orlans | B05B 1/267 239/518 |
| 2017/0056899 | A1 | 3/2017 | Kim | |
| 2017/0203311 | A1 | 7/2017 | Kim | |
| 2017/0348709 | A1 | 12/2017 | Kah, Jr. | |
| 2018/0141060 | A1* | 5/2018 | Walker | B05B 3/005 |
| 2018/0221895 | A1 | 8/2018 | McCarty | |
| 2018/0250692 | A1 | 9/2018 | Kah, Jr. | |
| 2018/0280994 | A1* | 10/2018 | Walker | B05B 1/169 |
| 2018/0311684 | A1 | 11/2018 | Lawyer | |
| 2019/0015849 | A1* | 1/2019 | Geerligs | B05B 3/0486 |
| 2019/0054480 | A1 | 2/2019 | Sesser | |
| 2019/0054481 | A1 | 2/2019 | Sesser | |
| 2019/0118195 | A1* | 4/2019 | Geerligs | B05B 3/0486 |
| 2019/0133059 | A1 | 5/2019 | Dewitt | |
| 2019/0143361 | A1 | 5/2019 | Kah, Jr. | |
| 2019/0193095 | A1 | 6/2019 | Sesser | |
| 2020/0276598 | A1* | 9/2020 | Belongia | B05B 3/0486 |
| 2020/0353497 | A1* | 11/2020 | Belongia | B05B 12/002 |

FOREIGN PATENT DOCUMENTS

| | | | |
|---|---|---|---|
| CN | 2794646 | | 7/2006 |
| CN | 2805823 | | 8/2006 |
| DE | 1283591 | B | 11/1968 |
| DE | 3335805 | A1 | 2/1985 |
| DE | 19925279 | | 12/1999 |
| EP | 0274082 | | 7/1988 |
| EP | 0463742 | | 1/1992 |
| EP | 0489679 | | 6/1992 |
| EP | 0518579 | | 12/1992 |
| EP | 0572747 | | 12/1993 |
| EP | 0646417 | | 4/1995 |
| EP | 0724913 | A2 | 8/1996 |
| EP | 0761312 | A1 | 12/1997 |
| EP | 1016463 | | 7/2000 |
| EP | 1043077 | | 10/2000 |
| EP | 1043075 | A1 | 11/2000 |
| EP | 1173286 | | 1/2002 |
| EP | 1250958 | | 10/2002 |
| EP | 1270082 | | 1/2003 |
| EP | 1289673 | | 3/2003 |
| EP | 1426112 | | 6/2004 |
| EP | 1440735 | | 7/2004 |
| EP | 1452234 | | 9/2004 |
| EP | 1502660 | | 2/2005 |
| EP | 1508378 | | 2/2005 |
| EP | 1818104 | | 8/2007 |
| EP | 1944090 | | 7/2008 |
| EP | 2251090 | A2 | 11/2010 |
| EP | 2255884 | A1 | 12/2010 |
| EP | 3311926 | | 4/2018 |
| FR | 2730901 | | 9/1997 |
| GB | 908314 | | 10/1962 |
| GB | 1234723 | | 6/1971 |
| GB | 2330783 | | 5/1999 |
| IL | 35182 | | 4/1973 |
| WO | 1995020988 | | 8/1995 |
| WO | 1997027951 | | 8/1997 |
| WO | 9735668 | | 10/1997 |
| WO | 2000007428 | | 12/2000 |
| WO | 200131996 | | 5/2001 |
| WO | 2001031996 | | 5/2001 |
| WO | 200162395 | | 8/2001 |
| WO | 2001062395 | | 8/2001 |
| WO | 2002078857 | | 10/2002 |
| WO | 2002098570 | | 12/2002 |
| WO | 2003086643 | | 10/2003 |
| WO | 2004052721 | | 6/2004 |
| WO | 2005099905 | | 10/2005 |
| WO | 2005115554 | | 12/2005 |
| WO | 2005123263 | | 12/2005 |
| WO | 2006108298 | | 10/2006 |
| WO | 2007131270 | | 11/2007 |
| WO | 2008130393 | | 10/2008 |
| WO | 2009036382 | | 3/2009 |
| WO | 2010036241 | | 4/2010 |
| WO | 2010126769 | | 11/2010 |
| WO | 2011075690 | | 6/2011 |
| WO | 2014018892 | | 1/2014 |
| WO | 2014124314 | | 8/2014 |

OTHER PUBLICATIONS

USPTO; U.S. Appl. No. 16/409,510; Office Action mailed Jun. 10, 2021; (pp. 1-11).

USPTO; U.S. Appl. No. 16/413,005; Notice of Allowance mailed Jul. 16, 2021; (pp. 1-5).

USPTO; U.S. Appl. No. 16/413,005; Office Action mailed Mar. 11, 2021; (pp. 1-9).

USPTO; U.S. Appl. No. 16/413,005; Office Action mailed Dec. 4, 2020; (pp. 1-15).

USPTO; U.S. Appl. No. 16/409,510; Final Rejection mailed Dec. 14, 2021; (pp. 1-12).

USPTO; U.S. Appl. No. 16/409,510; Notice of Allowance and Fees Due (PTOL-85) mailed Apr. 7, 2022; (pp. 1-11).

USPTO; U.S. Appl. No. 16/409,510; Notice of Allowance and Fees Due (PTOL-85) mailed May 3, 2022; (pp. 1-8).

USPTO; U.S. Appl. No. 16/409,510;Office Action (Non_Final Rejection) Sep. 1, 2021; (pp. 1-10).

* cited by examiner

IRRIGATION NOZZLE WITH ONE OR MORE GRIT VENTS

CROSS-REFERENCE TO RELATED APPLICATION

This application is a continuation of U.S. application Ser. No. 16/409,510, filed May 10, 2019, which is incorporated herein by reference in its entirety.

FIELD

This invention relates to irrigation nozzles and, more particularly, to an irrigation nozzle with one or more grit vents to limit accumulation of debris and grit in the nozzle.

BACKGROUND

Nozzles are commonly used for the irrigation of landscape and vegetation. In a typical irrigation system, various types of nozzles are used to distribute water over a desired area. However, these nozzles often utilize narrow flow channels having a small diameter, and due to this small diameter, they may be prone to clogging with grit or debris. It is therefore desirable to include features in the nozzles that limit the accumulation of debris and grit in the nozzles.

One type of irrigation nozzle is the rotary nozzle having a rotatable deflector with flutes for producing a plurality of relatively small water streams swept over a surrounding terrain area to irrigate adjacent vegetation. In such nozzles, water is directed upwardly against a rotatable deflector having a lower surface with curved flutes extending upwardly and turning radially outwardly with a spiral component of direction. The water impinges upon this underside surface of the deflector to fill these curved flutes and to rotatably drive the deflector. At the same time, the water is guided by the curved flutes for projection outwardly from the nozzle in the form of a plurality of relatively small water streams to irrigate a surrounding area. As the deflector is rotatably driven by the impinging water, the water streams are swept over the surrounding terrain area.

Grit or debris may accumulate in rotary nozzles in a variety of circumstances. For example, some rotary nozzles may be buried underground and mounted to a "pop up" assembly such that they are out of the way when in an inoperative state but "pop up" into an operative state when irrigation is desired. For such nozzles, grit or debris may accumulate in the rotary nozzles when they are in an inoperative state at or below ground level. Alternatively, grit or debris may tend to accumulate in the rotary nozzle by the actions of "popping up" into an operative state and/or "popping" back down into a retracted state.

Rotary nozzles may include narrow flow channels in the nozzle body that are oriented to direct water against the deflector. Grit or debris can accumulate in the interior of the rotary nozzles and clog the flow channels. When the flow channels clog, the flow of water through the nozzle may be blocked or significantly reduced, and the deflector may cease to rotate. This stalled condition and reduced flow to the deflector may result in non-uniform distribution of water with certain areas being insufficiently watered.

Other types of nozzles also include narrow flow channels that can become clogged with grit and debris. For example, nozzles with fixed deflectors (in contrast to rotary nozzles with rotating deflectors) often include components with narrow flow channels that may become obstructed with grit and debris. As another example, one-piece nozzles (in contrast to nozzles composed of several different components) may also include such narrow flow channels. Accordingly, it should be understood that the benefit of addressing grit and debris is common with many different types of nozzles.

In rotary nozzles (and in other nozzles with narrow flow channels exposed to grit or debris), it is desirable to address the potential flow of grit and debris into the flow channels in order to prevent clogging. Further, it is also desirable to divert grit or debris away from the flow channels and without accumulating in or on the nozzle. Accordingly, there is a need for a nozzle that is structurally configured to limit accumulation of debris and grit in flow channels of the nozzle.

DESCRIPTION OF THE PREFERRED EMBODIMENT

Figure 1:
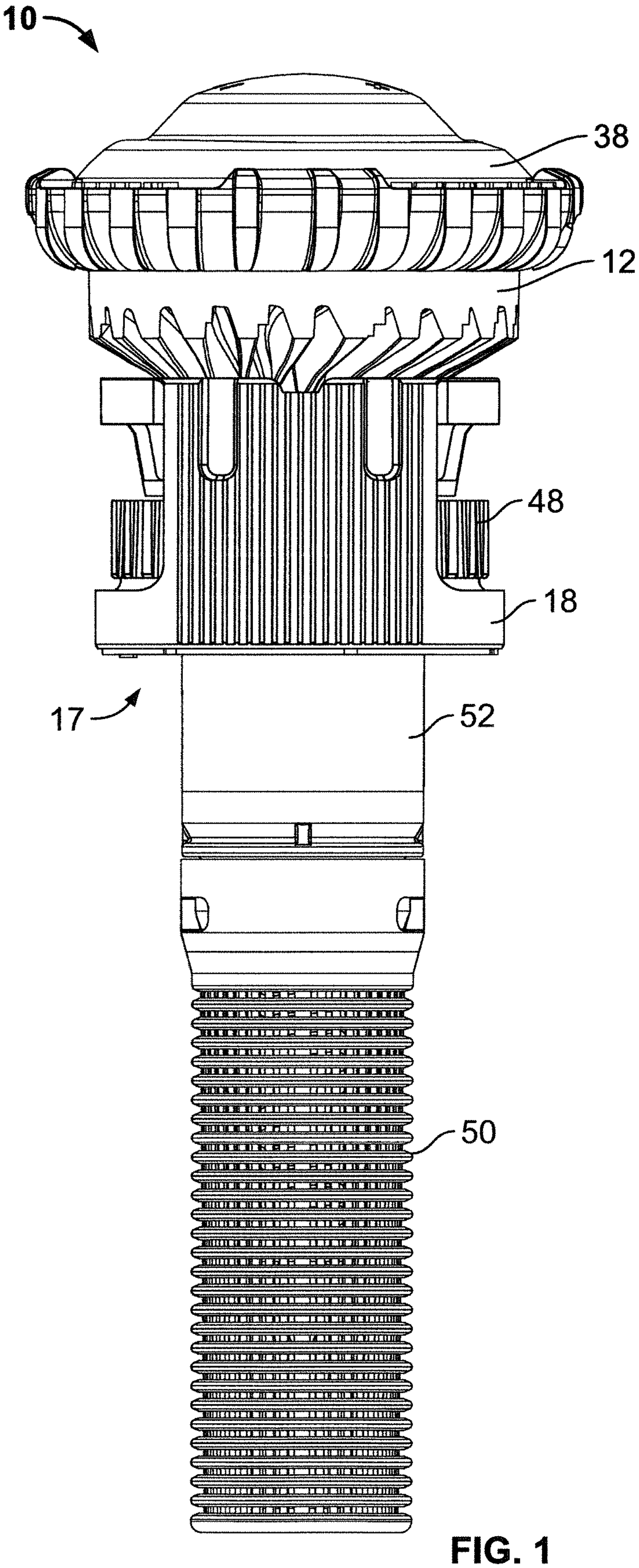
FIG. 1 is a perspective view of an embodiment of a nozzle embodying features of the present invention.

FIGS. 1-4B show an embodiment of a rotary nozzle 10 with a grit diversion feature that embodies aspects of the present invention. The particular rotary nozzle 10 described herein includes multiple flow channels and is intended for strip irrigation, i.e., irrigation of a generally rectangular pattern. This particular nozzle 10 is disclosed herein, in part, for illustrative purposes to show the structural interaction of various nozzle components with each other and with the grit diversion feature.

It should be understood, however, that the grit diversion feature described herein may be used with other types of rotary nozzles, such as, for example, rotary nozzles intended to provide irrigation to a defined arcuate coverage area about the nozzle or rotary nozzles intended to provide full circle irrigation about the nozzle. It is also contemplated that the grit diversion feature is not necessarily limited to rotary nozzles and may be used with other types of nozzles where grit is a concern. For example, this grit diversion feature may be used with other types of nozzles with one or more flow channels, which might include nozzles with fixed (non-rotating) deflectors, single-piece nozzles, high efficiency variable arc nozzles, matched precipitation rate nozzles, etc. Examples of some of these nozzle types are described in U.S. Pat. Nos. 8,651,400; 9,314,952; 9,427,751; and 9,504,209 and in U.S. Publication Nos. 2014/0263735 and 2014/0263757, all of which are incorporated herein.

Some of the structural components of the nozzle 10 are similar to those described in U.S. Pat. Nos. 9,295,998 and 9,327,297, and in U.S. Publication Nos. 2018/0141060 and 2019/0015849, all of which are incorporated by reference herein. These components are provided for an understanding of the various aspects of one embodiment, but as should be understood, not all of these components are required for operation of other embodiments within the scope of this disclosure. For example, it is generally contemplated that the grit diversion feature described herein may be used with other types of components.

As described in more detail below, in this particular example of a rotary nozzle, the nozzle 10 includes a rotating deflector 12 and two bodies (a valve sleeve 16 and nozzle housing 18) that together define multiple flow channels to produce the strip irrigation pattern (as addressed further below). The deflector 12 is supported for rotation by a shaft 20, which itself does not rotate. Indeed, in certain preferred forms, the shaft 20 may be fixed against rotation, such as through use of splined engagement surface 72.

Figure 2:
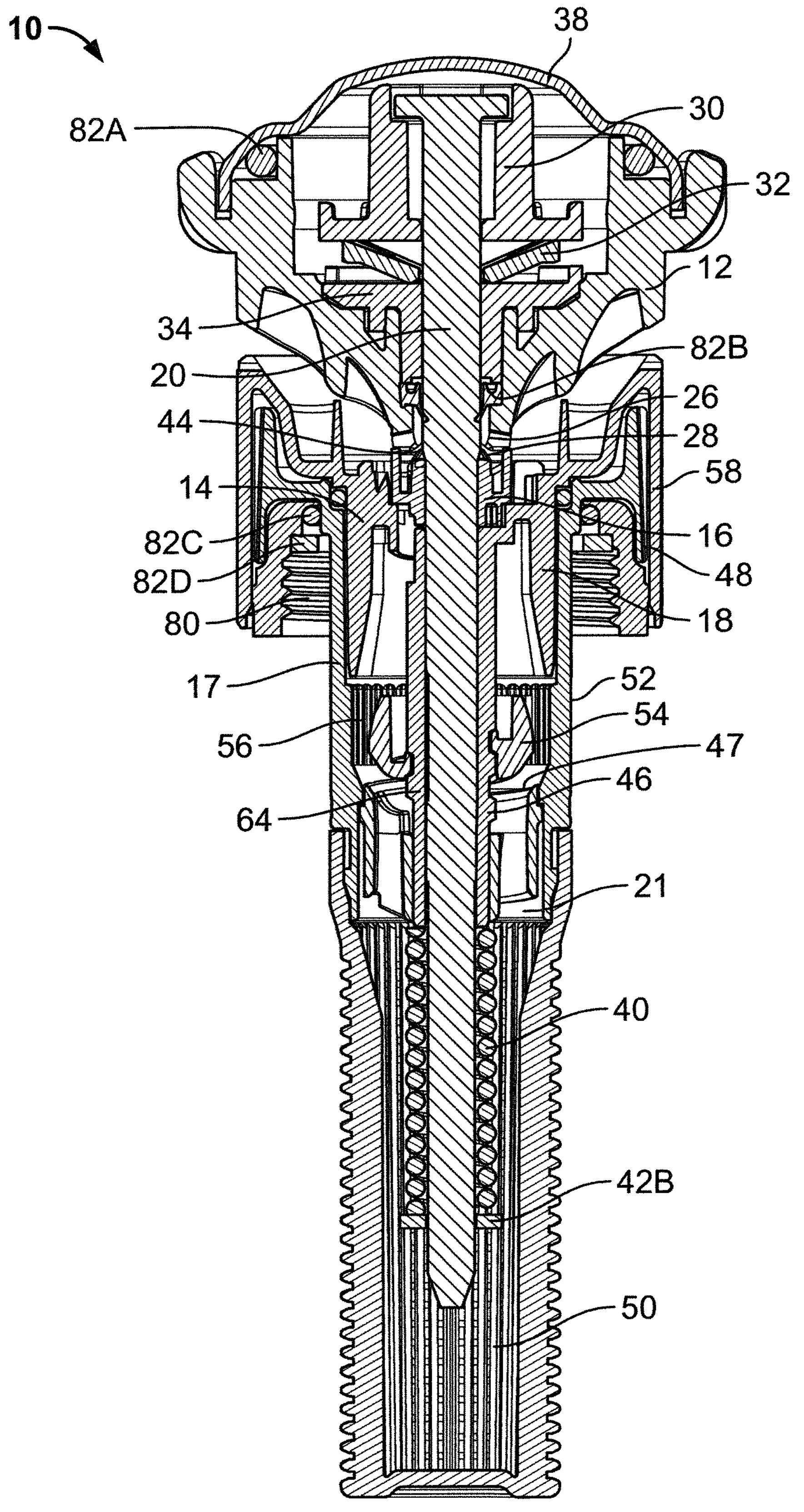
FIG. 2 is a cross-sectional view of the nozzle of FIG. 1.

The nozzle 10 generally comprises a compact unit, preferably made primarily of lightweight molded plastic, which is adapted for convenient thread-on mounting onto the upper end of a stationary or pop-up riser (not shown). In operation, water under pressure is delivered through the riser to a nozzle body 17. As can be seen in FIGS. 1 and 2, the nozzle body 17 generally refers to the sub-assembly of components disposed between the filter 50 and the deflector 12. The water preferably passes through an inlet 21 controlled by a radius adjustment feature that regulates the amount of fluid flow through the nozzle body 17. Water is then directed generally upwardly through flow passages in the nozzle housing 18 and through the multiple flow channels (defining an outlet to the nozzle body 17) to produce upwardly directed water jets that impinge the underside surface of the deflector 12 for rotatably driving the deflector 12.

Figure 4A:
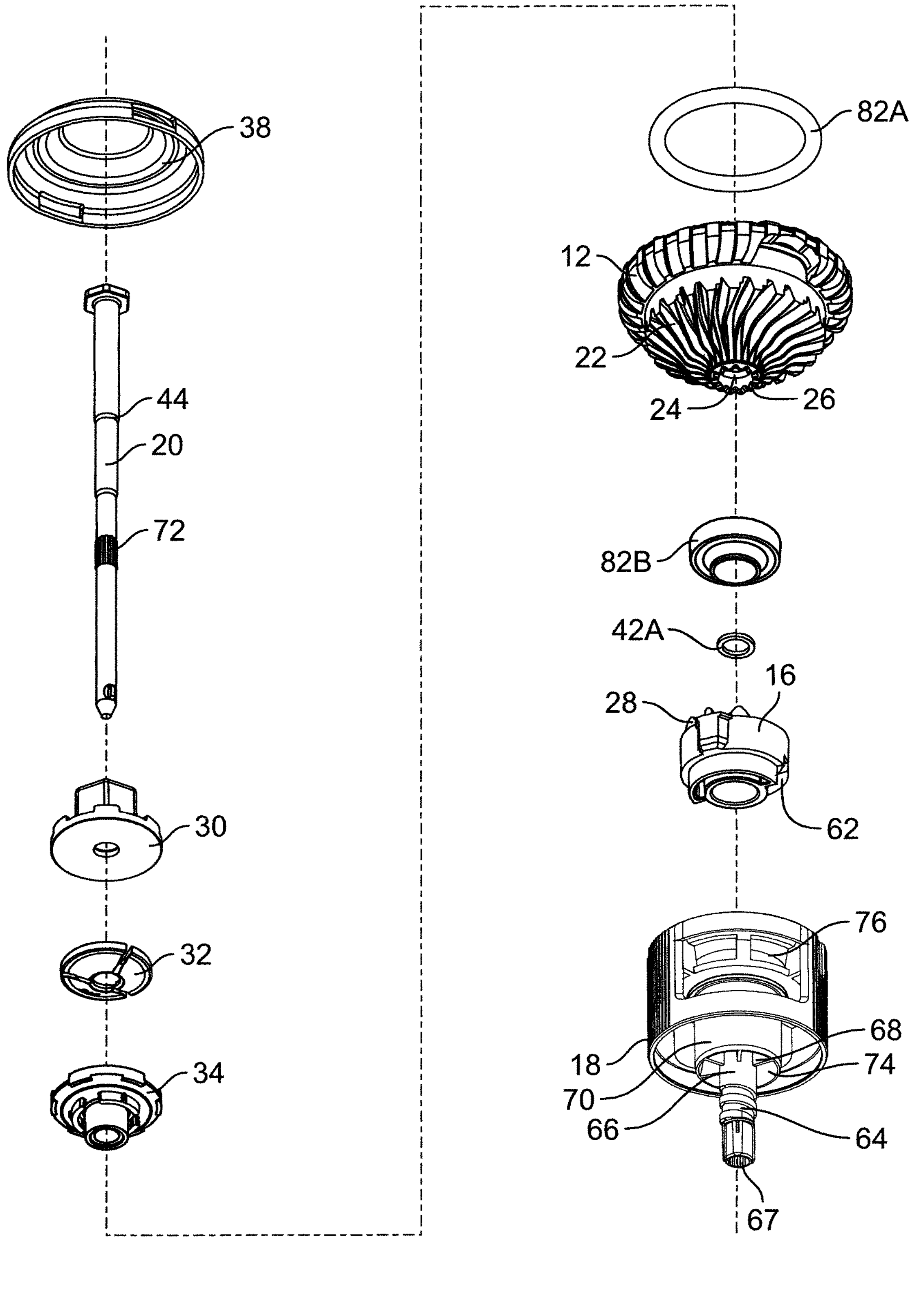
FIGS. 4A and 4B are bottom exploded perspective views of the nozzle of FIG. 1.

The rotatable deflector 12 has an underside surface that is preferably contoured to deliver a plurality of fluid streams generally radially outwardly. As shown in FIG. 4A, the underside surface of the deflector 12 includes an array of flutes 22. The flutes 22 subdivide the water into the plurality of relatively small water streams which are distributed radially outwardly to surrounding terrain as the deflector 12 rotates. The flutes 22 define a plurality of intervening flow channels extending upwardly and outwardly along the underside surface with various selected inclination angles. During operation of the nozzle 10, the upwardly directed water impinges upon the lower or upstream segments of these flutes 22, which subdivide the water flow into the plurality of relatively small flow streams for passage through the flow channels and radially outward projection from the nozzle 10.

The deflector 12 has a bore 24 for extension of a shaft 20 there through. As can be seen in FIG. 4A, the bore 24 is preferably surrounded at its lower end by circumferentially-arranged, downwardly-protruding teeth 26. As described further below, these teeth 26 are sized to engage corresponding teeth 28 on the valve sleeve 16. In some preferred forms, depending on the type of nozzle, this engagement allows a user to depress the deflector 12, so that the deflector teeth 26 and valve sleeve teeth 28 engage, and then rotate to clear out debris and/or to rotate the entire nozzle 10 to conveniently install the nozzle 10 on a retracted riser stem.

The deflector 12 also preferably includes a speed control brake to control the rotational speed of the deflector 12. In one preferred form shown in FIGS. 2, 3A, and 4A, the speed control brake includes a friction disk 30, a brake pad 32, and a seal retainer 34. The friction disk 30 preferably has an internal surface (or socket) for engagement with a top surface (or head) on the shaft 20 so as to fix the friction disk 30 against rotation. The seal retainer 34 is preferably welded to, and rotatable with, the deflector 12 and, during operation of the nozzle 10, is urged against the brake pad 32, which, in turn, is retained against the friction disk 30. Water is directed upwardly and strikes the deflector 12, pushing the deflector 12 and seal retainer 34 upwards and causing rotation. In turn, the rotating seal retainer 34 engages the brake pad 32, resulting in frictional resistance that serves to reduce, or brake, the rotational speed of the deflector 12. Speed brakes like the type shown in U.S. Pat. No. 9,079,202 and U.S. Publication No. 2018/0141060, which are assigned to the assignee of the present application and are incorporated herein by reference in their entirety, are preferably used. Although the speed control brake is shown and preferably used in connection with nozzle 10 described and claimed herein, other brakes or speed reducing mechanisms are available and may be used to control the rotational speed of the deflector 12.

The deflector 12 is supported for rotation by shaft 20. Shaft 20 extends along a central axis of the nozzle 10, and the deflector 12 is rotatably mounted on an upper end of the shaft 20. As can be seen from FIGS. 2 and 4A, the shaft 20 extends through the bore 24 in the deflector 12 and through aligned bores in the friction disk 30, brake pad 32, and seal retainer 34, respectively. A cap 38 and o-ring, 82A are mounted to the top of the deflector 12. The cap 38, in conjunction with the o-ring, 82A, help to limit grit and other debris from coming into contact with the components in the interior of the deflector sub-assembly, such as the speed control brake components, and thereby hindering the operation of the nozzle 10.

A spring 40 mounted to the shaft 20 energizes and tightens the engagement of the valve sleeve 16 and the nozzle housing 18. More specifically, the spring 40 operates on the shaft 20 to bias the first of the two nozzle body portions (valve sleeve 16) downwardly against the second portion (nozzle housing 18). Mounting the spring 40 at one end of the shaft 20 results in a lower cost of assembly. As can be seen in FIG. 2, the spring 40 is mounted near the lower end of the shaft 20 and downwardly biases the shaft 20. In turn, the shaft shoulder 44 exerts a downward force on the washer/retaining ring 42A and valve sleeve 16 for pressed fit engagement with the nozzle housing 18.

As shown in FIG. 2, the nozzle 10 also preferably includes a radius control valve 46 (or radius adjustment valve). The radius control valve 46 can be used to adjust the fluid flowing through the nozzle 10 for purposes of regulating the range of throw of the projected water streams. It is adapted for variable setting through use of a rotatable segment 48 (FIG. 1) located on an outer wall portion of the nozzle 10. It functions as a valve that can be opened or closed to allow the flow of water through the nozzle 10. Also, a filter 50 is preferably located upstream of the radius control valve 46, so that it obstructs passage of sizable particulate and other debris that could otherwise damage the nozzle components or compromise desired efficacy of the nozzle 10.

As shown in FIGS. 2-4B, the radius control valve structure preferably includes a nozzle collar 52 and a flow control member 54. The nozzle collar 52 is rotatable about the central axis of the nozzle 10. It preferably has a splined internal engagement surface 56 to engage radial tabs 62 of the flow control member 54 in the bore 57 of the nozzle collar 52 so that rotation of the nozzle collar 52 results in rotation of the flow control member 54. The flow control member 54 also engages the nozzle housing 18 such that rotation of the flow control member 54 causes the member 54 to also move in an axial direction, as described further below. In this manner, rotation of the nozzle collar 52 can be used to move the flow control member 54 helically in an axial direction closer to and further away from the inlet 21. When the flow control member 54 is moved closer to the inlet 21, the throw radius is reduced. The axial movement of the flow control member 54 towards the inlet 21 increasingly constricts the flow through the inlet 21 just downstream of the inlet 21. When the flow control member 54 is moved further away from the inlet 21, the throw radius is increased until the maximum radius position is achieved. This axial movement allows the user to adjust the effective throw radius of the nozzle 10 without disruption of the streams dispersed by the deflector 12. A clutching mechanism, including radial tabs 62, preferably prevents excessive torque application or over-travel of the flow control member 54 when the flow control member 54 is in its most distant position, or maximum radius setting, from the inlet 21.

As shown in FIGS. 2-4B, the nozzle collar 52 is preferably cylindrical in shape and also includes an outer wall 58 having an external grooved surface for gripping and rotation by a user. Water flowing through the inlet 21 passes through the interior of the cylinder and through the remainder of the nozzle body 17 to the deflector 12. Rotation of the outer wall 58 causes rotation of the entire nozzle collar 52.

Figure 3A:
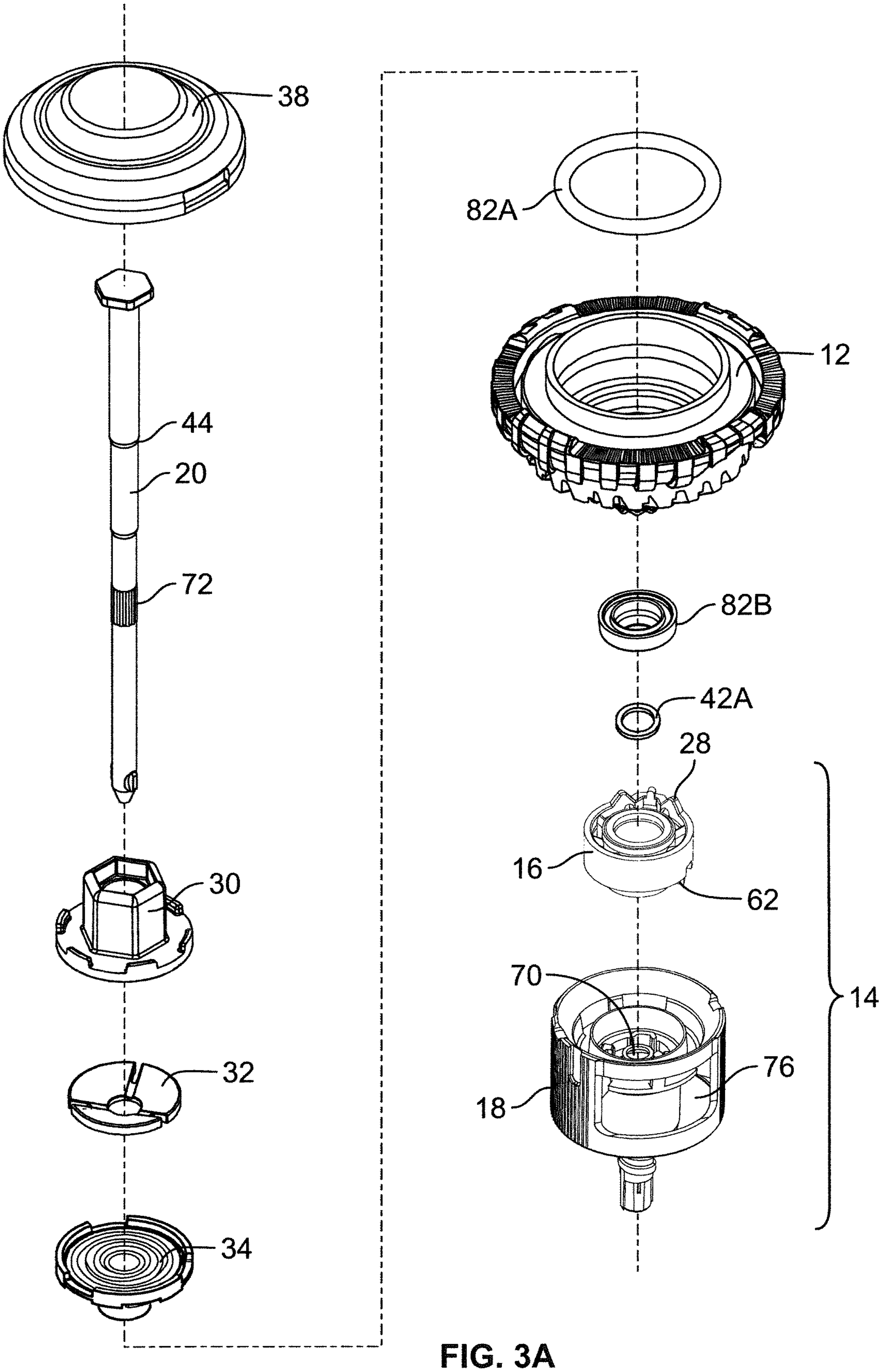
FIGS. 3A and 3B are top exploded perspective views of the nozzle of FIG. 1.
Figure 3B:
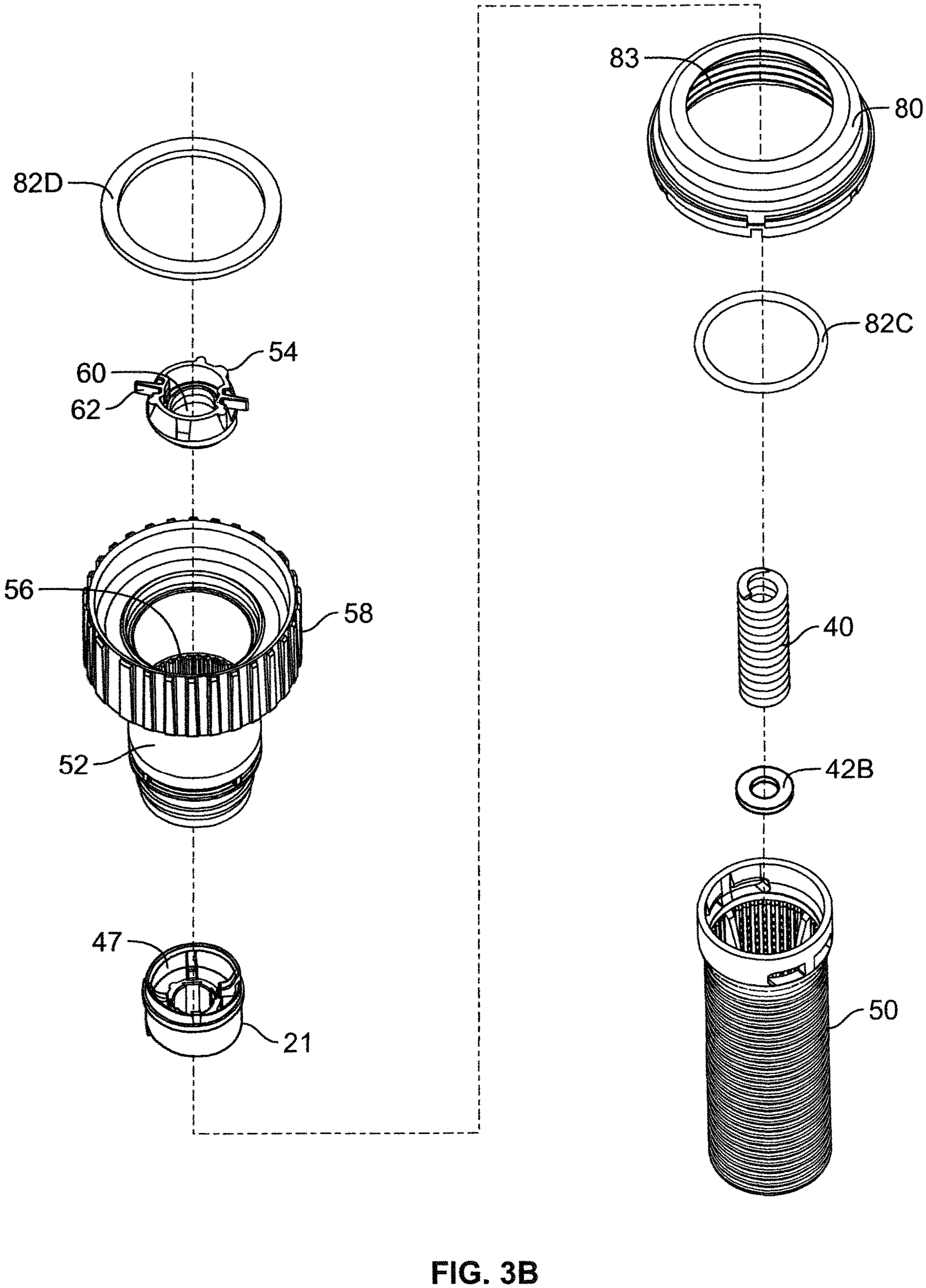
Figure 4B:
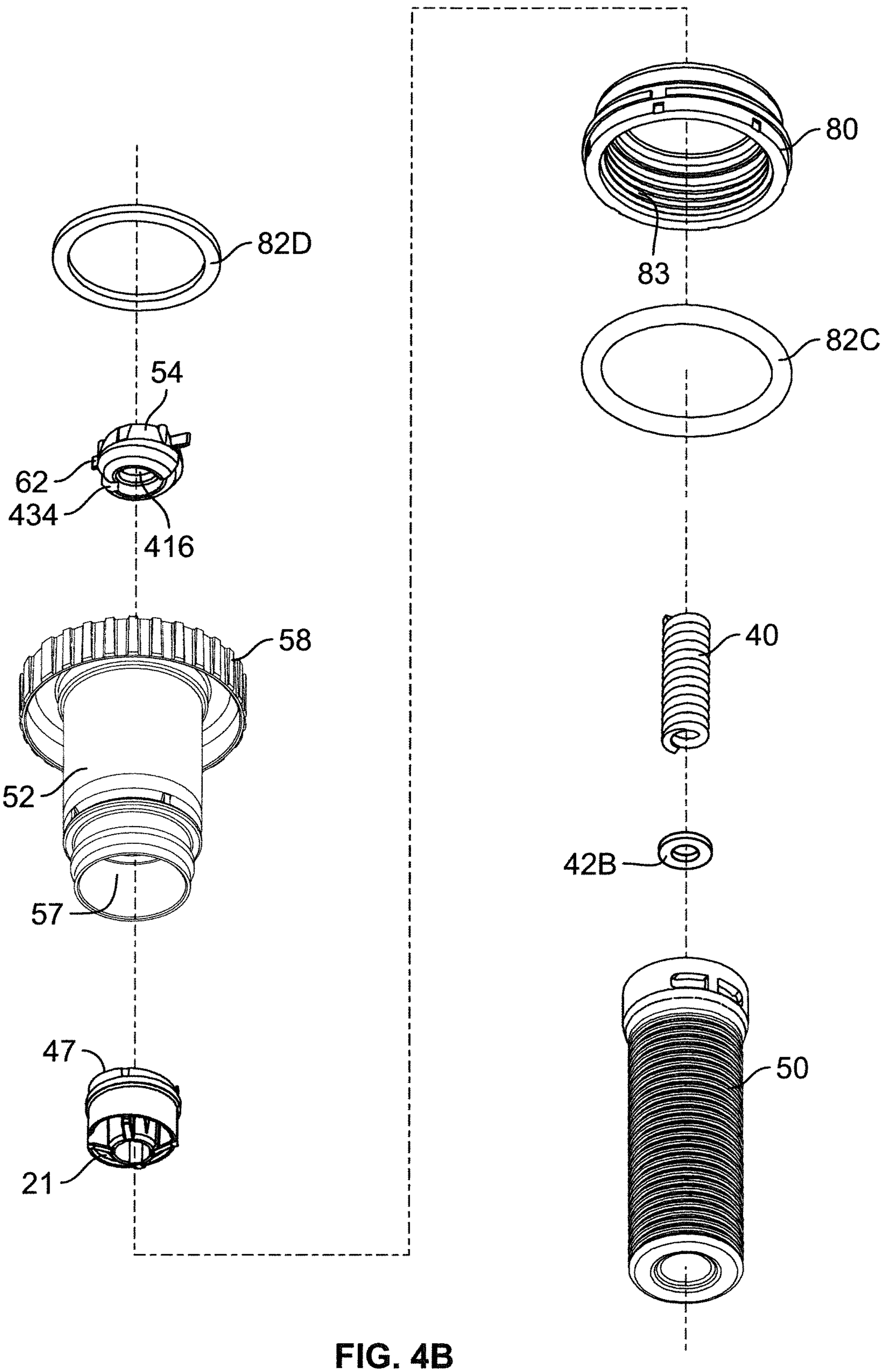

The nozzle collar 52 is coupled to the flow control member 54 (or throttle control member). As shown in FIGS. 3B and 4B, the flow control member 54 is preferably in the form of a ring-shaped nut with a central hub defining a central bore 60. The flow control member 54 has an external surface with two thin tabs 62 extending radially outward for engagement with the corresponding internal splined surface 56 of the nozzle collar 52. The tabs 62 and internal splined surface 56 interlock such that rotation of the nozzle collar 52 causes rotation of the flow control member 54 about the central axis. In addition, these tabs 62 of the flow control member 54 act as a clutching mechanism that prevents over-travel and excessive application of torque, as well as providing a tactile and audible feedback to the user when the flow control member 54 reaches its respective limits of travel.

In turn, the flow control member 54 is coupled to the nozzle housing 18. More specifically, the flow control member 54 is internally threaded for engagement with an externally threaded hollow post 64 at the lower end of the nozzle housing 18. Rotation of the flow control member 54 causes it to move along the threading in an axial direction. In one preferred form, rotation of the flow control member 54 in a counterclockwise direction advances the member 54 towards the inlet 21 and away from the deflector 12. Conversely, rotation of the flow control member 54 in a clockwise direction causes the member 54 to move away from the inlet 21. Although specified here as counterclockwise for advancement toward the inlet 21 and clockwise for movement away from the inlet 21, this is not required, and either rotation direction could be assigned to the advancement and retreat of the flow control member 54 from the inlet 21. Finally, although threaded surfaces are shown in the preferred embodiment, it is contemplated that other engagement surfaces could be used to achieve an axial movement of the flow control member 54.

The nozzle housing 18 preferably includes an inner cylindrical wall 66 joined by spoke-like ribs 68 to a central hub 70. The inner cylindrical wall 66 preferably defines the bore 67 to accommodate extension of the shaft 20 therethrough. The inside of the central hub 70 is preferably splined to engage a splined surface 72 of the shaft 20 and fix the shaft 20 against rotation. The lower end forms the external threaded hollow post 64 for insertion in the bore 60 of the flow control member 54, as discussed above. The spokes 68 define flow passages 74 to allow fluid flow upwardly through the remainder of the nozzle 10.

In operation, a user may rotate the outer wall 58 of the nozzle collar 52 in a clockwise or counterclockwise direction. As shown in FIGS. 3A and 4A, the nozzle housing 18 preferably includes one or more cut-out portions 76 to define one or more access windows to allow rotation of the nozzle collar outer wall 58. Further, as shown in FIG. 2, the nozzle collar 52, flow control member 54, and nozzle housing 18 are oriented and spaced to allow the flow control member 54 to essentially limit fluid flow through the nozzle 10 or to allow a desired amount of fluid flow through the nozzle 10. The flow control member 54 preferably has a radiused helical bottom surface 78 for engagement with a matching notched helical surface 79 on the inlet member. This matching helical surface 79 acts as a valve seat 47 but preferably with a segmented 360 degree pattern to allow a minimum flow when the matching helical surfaces 78 and 79 are fully engaged. The inlet 21 can be a separate insert component that snap fits and locks into the bottom of the nozzle collar 52. The inlet 21 also includes a bore 87 to receive the hollow post 64 of the nozzle housing 18. The bore 87 and the post 64 include complementary gripping surfaces (FIGS. 4A and 4B) so that the inlet 21 is locked against rotation.

Rotation in a counterclockwise direction results in helical movement of the flow control member 54 in an axial direction toward the inlet 21. Continued rotation results in the flow control member 54 advancing to the valve seat 47 formed at the inlet 21 for restricting or significantly reducing fluid flow. The dimensions of the radial tabs 62 of the flow control member 54 and the splined internal surface 56 of the nozzle collar 52 are preferably selected to provide over-rotation protection. More specifically, the radial tabs 62 are sufficiently flexible such that they slip out of the splined recesses upon over-rotation, i.e., clutching. Once the limit of the travel of the flow control member 54 has been reached, further rotation of the nozzle collar 52 causes clutching of the radial tabs 62, allowing the collar 52 to continue to rotate without corresponding rotation of the flow control member 54, which might otherwise cause potential damage to the nozzle components.

Rotation in a clockwise direction causes the flow control member 54 to move axially away from the inlet 21. Continued rotation allows an increasing amount of fluid flow through the inlet 21, and the nozzle collar 52 may be rotated to the desired amount of fluid flow. It should be evident that the direction of rotation of the outer wall 58 for axial movement of the flow control member 54 can be easily reversed, i.e., from clockwise to counterclockwise or vice versa, such as by changing the direction of threading on post 64. When the valve is open, fluid flows through the nozzle 10 along the following flow path: through the inlet 21, between the nozzle collar 52 and the flow control member 54, through the passages 74 of the nozzle housing 18, through the constriction formed at the valve sleeve 16, to the underside surface of the deflector 12, and radially outwardly from the deflector 12.

The nozzle 10 also preferably includes a nozzle base 80 of generally cylindrical shape with internal threading 83 for quick and easy thread-on mounting onto a threaded upper end of a riser with complementary threading (not shown). The nozzle base 80 and nozzle housing 18 are preferably attached to one another by welding, snap-fit, or other fastening method such that the nozzle housing 18 is stationary relative to the base 80 when the base 80 is threadedly mounted to a riser. The nozzle 10 also preferably include seal members, such as seal members 82A, 82B, 82C, and 82D, at various positions, such as shown in FIGS. 2-4B, to reduce leakage. The nozzle 10 also preferably includes retaining rings or washers, such as retaining rings/washers 42A and 42B, disposed, for example, at the top of valve sleeve 16 (preferably for engagement with shaft shoulder 44) and near the bottom end of the shaft 20 for retaining the spring 40.

The radius adjustment valve 46 and certain other components described herein are preferably similar to that described in U.S. Pat. Nos. 8,272,583 and 8,925,837, which are assigned to the assignee of the present application and are incorporated herein by reference in their entirety. Generally, in this preferred form, the user rotates the nozzle collar 52 to cause the flow control member 54 to move axially toward and away from the valve seat 47 at the inlet 21 to adjust the throw radius. Although this type of radius adjustment valve 46 is described herein, it is contemplated that other types of radius adjustment valves may also be used.

Figure 6:
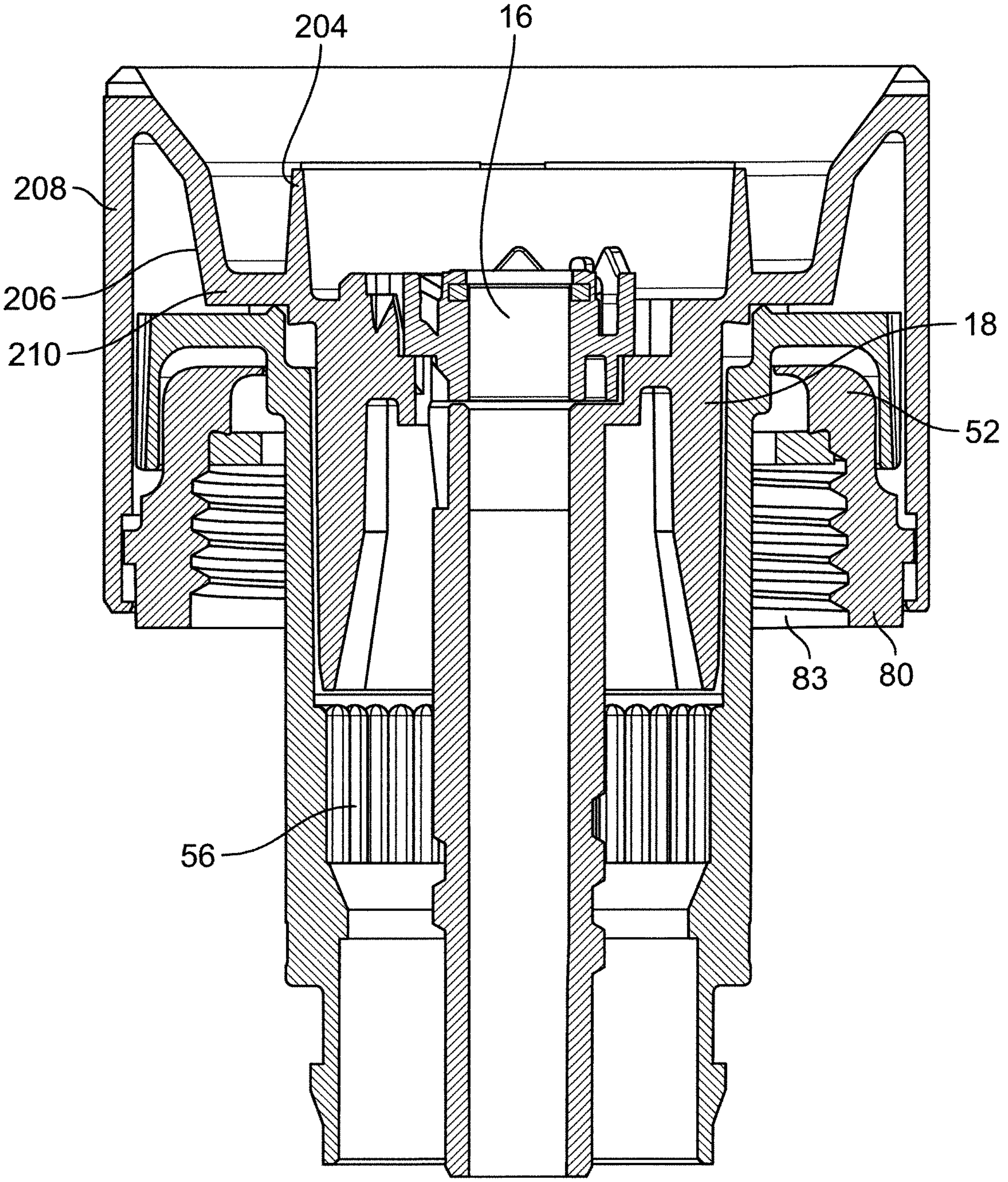
FIG. 6 is a cross-sectional view of an assembled valve sleeve, nozzle housing, nozzle collar, and nozzle base of the nozzle of FIG. 1.
Figure 7:
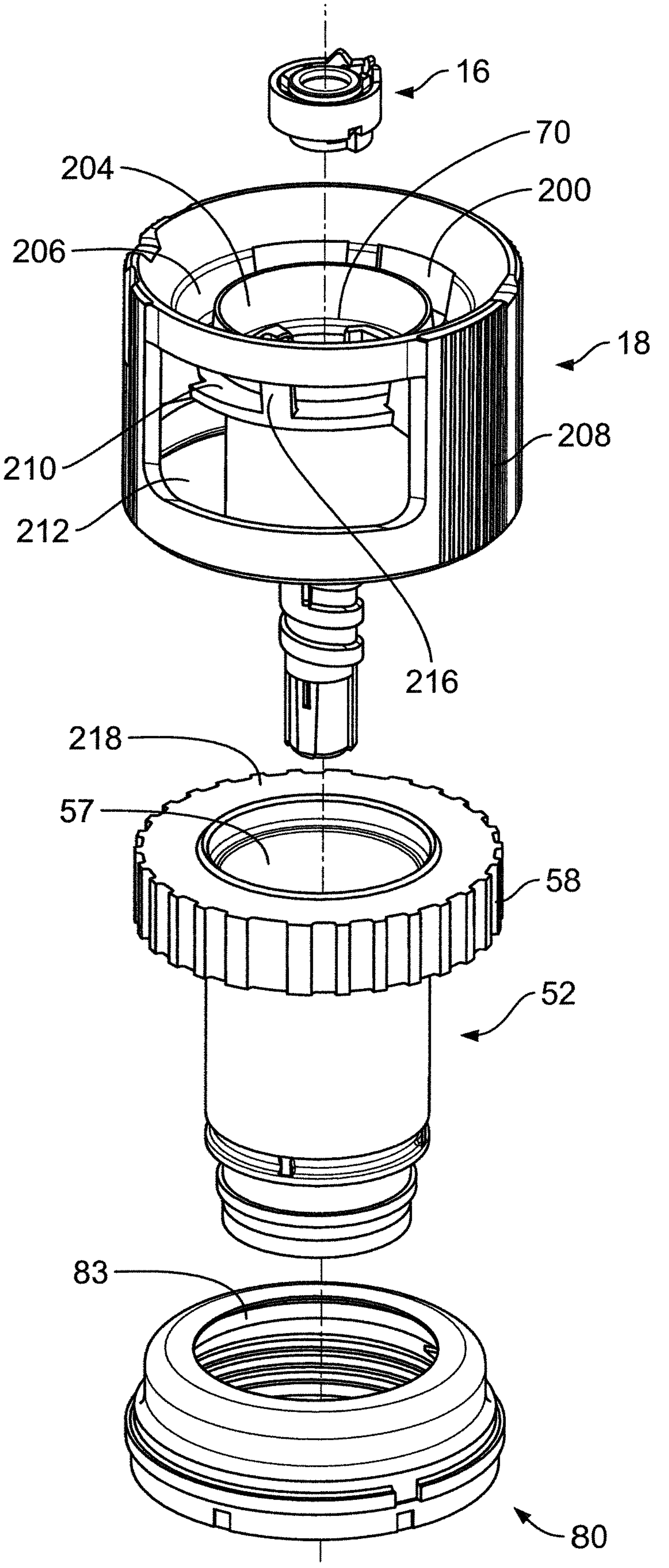
FIG. 7 is a top exploded perspective of the valve sleeve, nozzle housing, nozzle collar, and nozzle base of the nozzle of FIG. 1.
Figure 8:
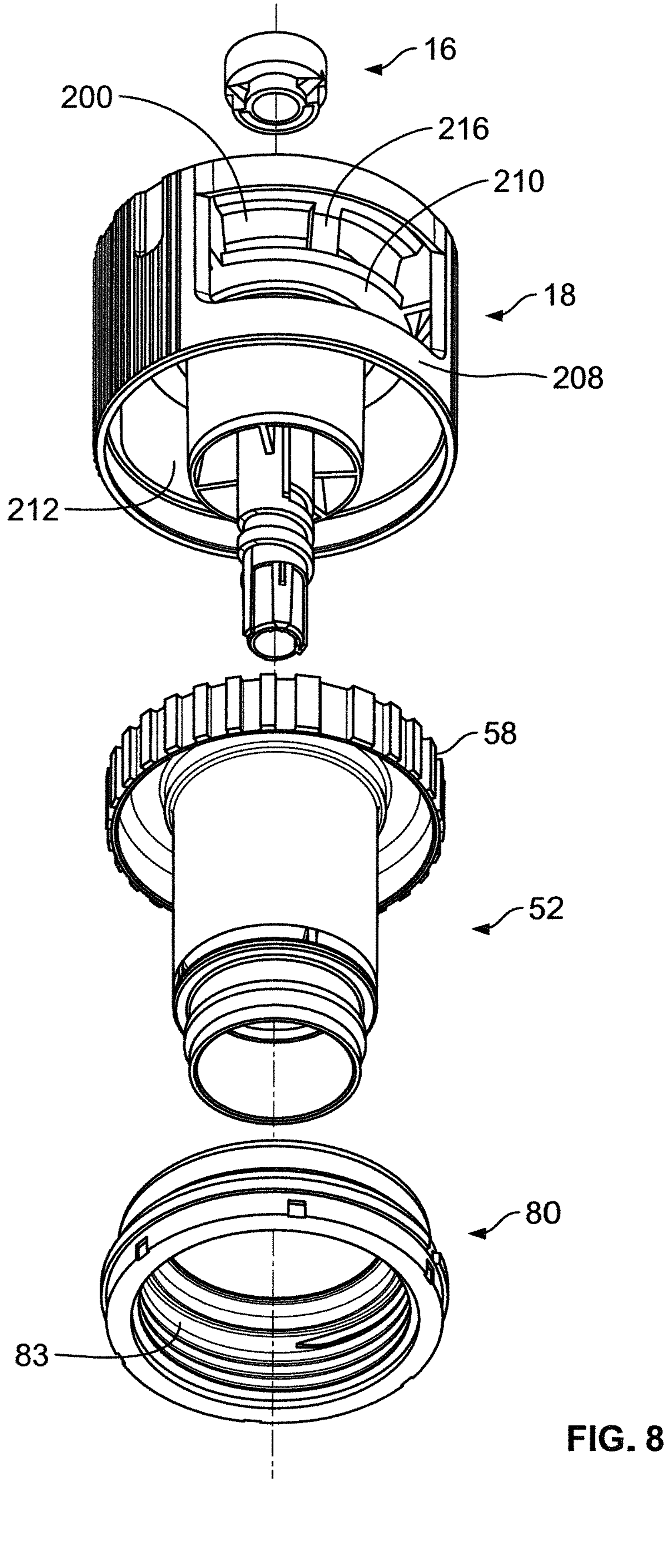
FIG. 8 is a bottom exploded perspective view of the valve sleeve, nozzle housing, nozzle collar, and nozzle base of the nozzle of FIG. 1.

The nozzle 10 described above uses a pattern template 14 to determine the pattern of irrigation coverage, i.e., a rectangular strip, a half circle or other partial circular area, a full circle area, etc. As used herein, it should be understood that pattern template is used to refer to the one or more components in the nozzle that determine the pattern of irrigation coverage. In this particular example, as can be seen from FIGS. 2, 6, and 9, the pattern template 14 includes two bodies that interact with one another to determine the pattern of irrigation coverage: the valve sleeve 16 and the nozzle housing 18. In this particular example, the nozzle 10 is intended to produce a rectangular strip pattern. However, it should be understood that different pattern templates may be used, which may be composed of one or more nozzle components (and not necessarily two components), and that these different pattern templates may define different irrigation patterns.

Figure 5:
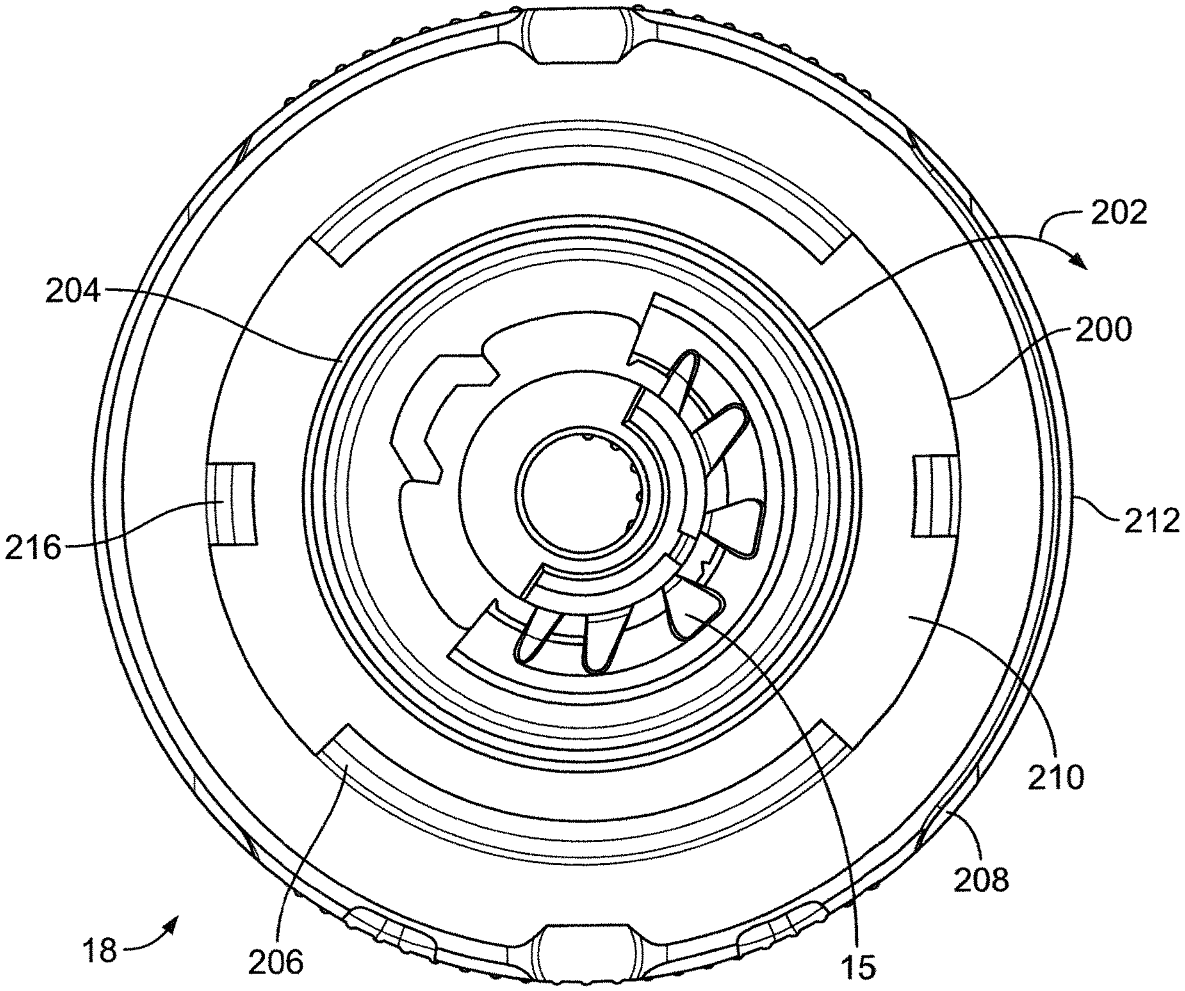
FIG. 5 is a top plan view of a nozzle housing of the nozzle of FIG. 1.

As shown in FIG. 5, in this particular example, there are six flow channels 15 in the nozzle housing 18. The six flow channels 15 have different geometries and orientations in order to fill in various parts of a side strip irrigation pattern, i.e., a rectangular irrigation pattern that extends to both sides of the nozzle 10. As should be understood, however, the nozzle housing may be designed to include other types of channels that are intended to produce other patterns of irrigation coverage (in combination with a modified valve sleeve). Examples of such nozzles with nozzle housings and valve sleeves that produce rectangular, partial circle, and full circle coverage are described in U.S. Pat. Nos. 9,295,998 and 9,327,297, and in U.S. Publication Nos. 2018/0141060 and 2019/0015849, which are assigned to the assignee of the present application. Regardless of the intended pattern of irrigation coverage, it is desirable to protect the channels in the nozzle housing from debris that might otherwise clog them. It is generally contemplated that grit may be introduced into the nozzle body 17 through the gap between the deflector 12 and the nozzle housing 18.

The disclosure above generally describes some components of an exemplary rotary nozzle 10 using a grit diversion feature. This description has been provided, in part, for illustrative purposes to provide a general understanding of certain types of nozzle components and their interaction with the grit diversion feature. It should be understood, however, that the grit diversion feature may be used with any of various different types of rotary nozzles, and those other rotary nozzles may or may not include some or all of the nozzle components described above. More specifically, it is generally contemplated that the grit diversion feature may be used with other types of nozzles that do not necessarily include a rotating deflector 12 but include one or more narrow flow channels in a central hub 70 that it is desirable to protect from grit and debris. For example, this grit diversion feature may be used with nozzles having fixed (non-rotating) deflectors, single-piece nozzles, high efficiency variable arc nozzles, matched precipitation rate nozzles, etc.

As shown in FIGS. 6-9, the grit diversion feature includes a grit vent 200 that is part of a grit flow path 202 involving several structural components defining a passage for grit or debris to exit the nozzle 10 through the grit vent 200. More specifically, the grit flow path 202 is defined by various features and interrelationships of the valve sleeve 16, nozzle housing 18, and nozzle collar 52, as addressed below. The structural arrangement of these features seeks to prevent grit or debris from accumulating in and on top of the nozzle body 17 and thereby clogging the flow channels 15.

As can be seen, the valve sleeve 16 is nested within the central hub 70 of nozzle housing 18 and is protected from grit or debris by an inner annular wall 204 of the nozzle housing 18. The valve sleeve 16 is preferably cylindrical in shape so that it can fit within this inner annular wall 204 and be protected from grit or debris by this inner annular wall 204. Further, the central hub 70 of the nozzle housing 18 includes the flow channels 15, which are to be protected from grit or debris by the inner annular wall 204. It is also contemplated that, depending on the shape of the valve sleeve 16 and the central hub 70, the wall 204 need not be annular and may be other shapes. For example, the wall may be oval or rectangular in shape if the central hub itself is oval/rectangular in shape so as to accommodate nesting of an oval/rectangular shaped valve sleeve therein.

The inner annular wall 204 of the nozzle housing 18 defines one portion of the grit flow path 202. The inner annular wall 204, or dam, is preferably as tall as the nozzle design will permit without interfering with the flow of the water through flow channels 15 and without interfering with retraction of the deflector 12 when the deflector 12 is in a non-operational position. In one preferred form, the dam is approximately 0.1 inches tall.

In addition to the inner annular wall 204, the nozzle housing 18 also includes an intermediate wall 206 and a ledge 210, or floor, connecting the inner and intermediate walls 204, 206. As addressed above, the nozzle housing 18 includes one or more cut-out portions 76 in an outer annular wall 208 to define one or more access windows 212 extending therethrough, and in this preferred form, there are two windows 212. As can be seen, in this particular example, the intermediate wall 206 and outer annular wall 208 are adjacent one another and formed generally from the same upstanding structure, but in some other preferred forms, it is contemplated that the intermediate wall 206 and outer annular wall 208 may be a single, unitary wall such that the grit vents 200 form part of the windows 212.

Figure 9:
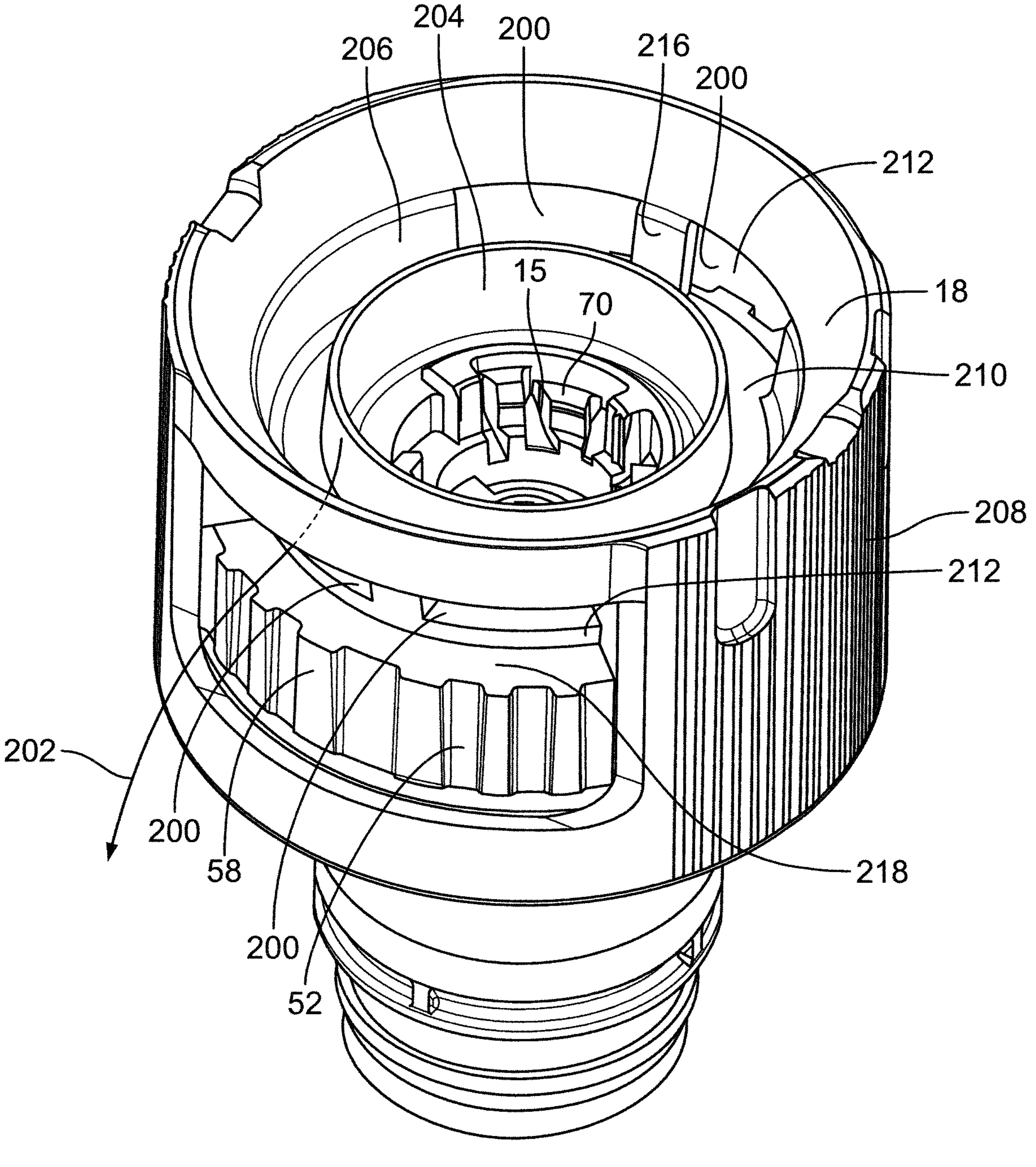
FIG. 9 is a top perspective partial view of the nozzle of FIG. 1 with the deflector, valve sleeve, and certain other components removed.
Figure 10:
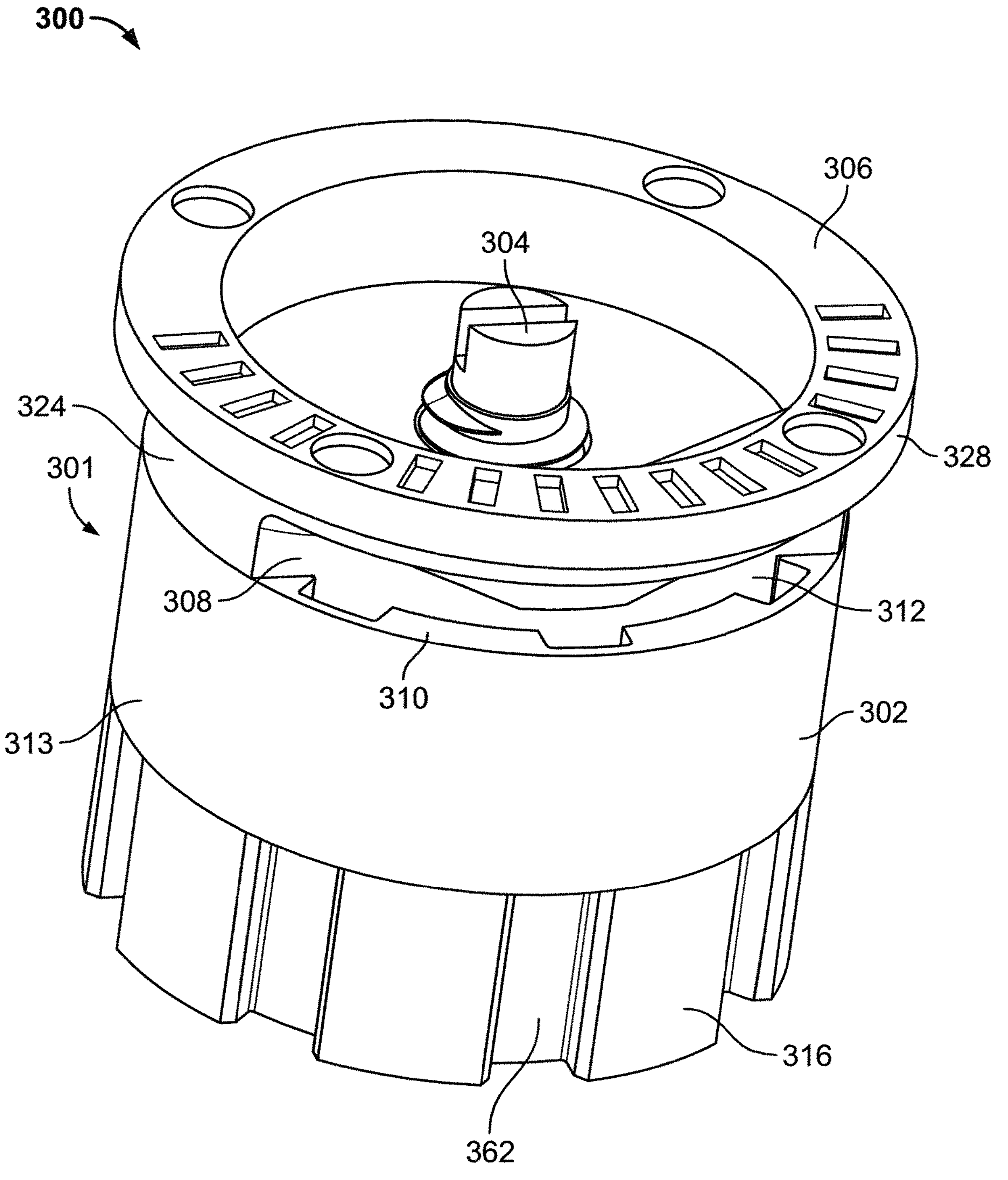
FIG. 10 is a perspective view of a second embodiment of a fixed deflector nozzle embodying features of the present invention.

The windows 212 are sized so that they can provide access to the grooved outer surface 58 of the nozzle collar 52 in the lower portion of each window 212. The height of the grooved outer surface 58 is less than the height of the window 212 so that each window 212 is in fluid communication with one or more grit vents 200 via the upper portion of each window 212 (or the grit vents 200 form part of the window 212). In this particular example, a portion of the intermediate wall 206 includes an upstanding support member 216 (extending upwardly from ledge 210) that bisects the wall portion to create two grit vents 200 in fluid communication with the upper portion of each window 212. As can be seen in FIG. 9, in this form, there are a total of four grit vents 200. In one preferred form, the grit vents 200 are each about 0.2 inches wide and about 0.1 inches high/tall.

In other words, the window 212 in the nozzle housing 18 in combination with the grooved outer wall 58 of the nozzle collar 52 (accessible through the window 212) define, in part, the general height and width of the grit vents 200. The bottom of the window 212 allows access to the nozzle collar 52, and the top of the window allows venting of debris and grit. The ledge 210 is seated on top of the top surface 218 of the nozzle collar 52, which allows grit to exit the nozzle housing 18 without interference. More specifically, when assembled, the entire nozzle collar 52 is below the ledge/floor 210 and the grit vents 200 of the nozzle housing 18 so as not to impede the grit from being flushed out of the nozzle.

As can be seen, the nozzle housing 18 is generally seated on the nozzle collar 52. In turn, the nozzle collar 52 is seated on the nozzle base 80, which has internal threading 83 for mounting on a water source. As addressed above, the nozzle housing 18 is affixed to the nozzle base 80 so that the nozzle housing 18 is not rotatable relative to the nozzle base 80. In contrast, the nozzle collar 52 (disposed, in part, between the nozzle housing 18 and the nozzle base 80) is not affixed to the nozzle base 80 and is rotatable relative to the nozzle base 80.

During operation of the nozzle, the inner annular wall 204 protects the flow channels in the interior of the nozzle from grit and debris. Further, the grit and debris is not allowed to accumulate on the ledge 210. Instead, during operation, any grit or debris tending to accumulate on the ledge 210 is flushed through the grit vents 200. It is believed that, when this grit diversion feature is incorporated into the design of a nozzle, it extends the useful life of the nozzle because the effect of grit on the small passages through the nozzle is reduced and potentially eliminated.

As addressed above, the particular nozzle 10 shown herein is intended for strip irrigation. However, it should be understood that the structural components defining grit path 202 can be utilized with many other types of nozzles. As stated, the grit path 202 and grit vents 200 can be incorporated generally into any type of nozzle having a central hub in its interior defining flow channels that are to be protected from grit and debris. The grit path 202 and grit vents 200 redirect grit and debris radially outwardly away from the flow channels in the interior of the nozzle.

FIGS. 10-16 show another example of a nozzle 300 that can incorporate a grit diversion feature. More specifically, FIGS. 10-16 show a nozzle 300 with a fixed, non-rotating deflector that includes a grit diversion feature. As explained in more detail below, one or more grit vents are disposed in an outer portion of the nozzle body to define a grit flow path and to direct grit away from flow passages disposed in the central hub of the nozzle body.

FIGS. 10-13 generally show the components of the nozzle 300. In one preferred form, the nozzle 300 is formed as a generally cylindrically shaped body from three interrelated but separate components comprising a base 302, a throttling screw 304, and a deflector 306. The base 302 and deflector 306 are preferably molded plastic components that are bonded together, such as by welding, to produce an integral unit and form the nozzle body 301. The throttling screw 304 is preferably then assembled to the nozzle 300 after assembly of the components 302, 306. In the assembled condition, the outlet 308 is preferably formed as a partial-circle arcuate opening defined between the upper end 310 of the base 302 and a partial-circle deflector recess 312 formed in the underside of the deflector 306. Although one example of the arcuate size of an outlet 308 is shown, it should be understood that other arcuate sizes are possible, including a full-circle arcuate outlet.

Figure 11:
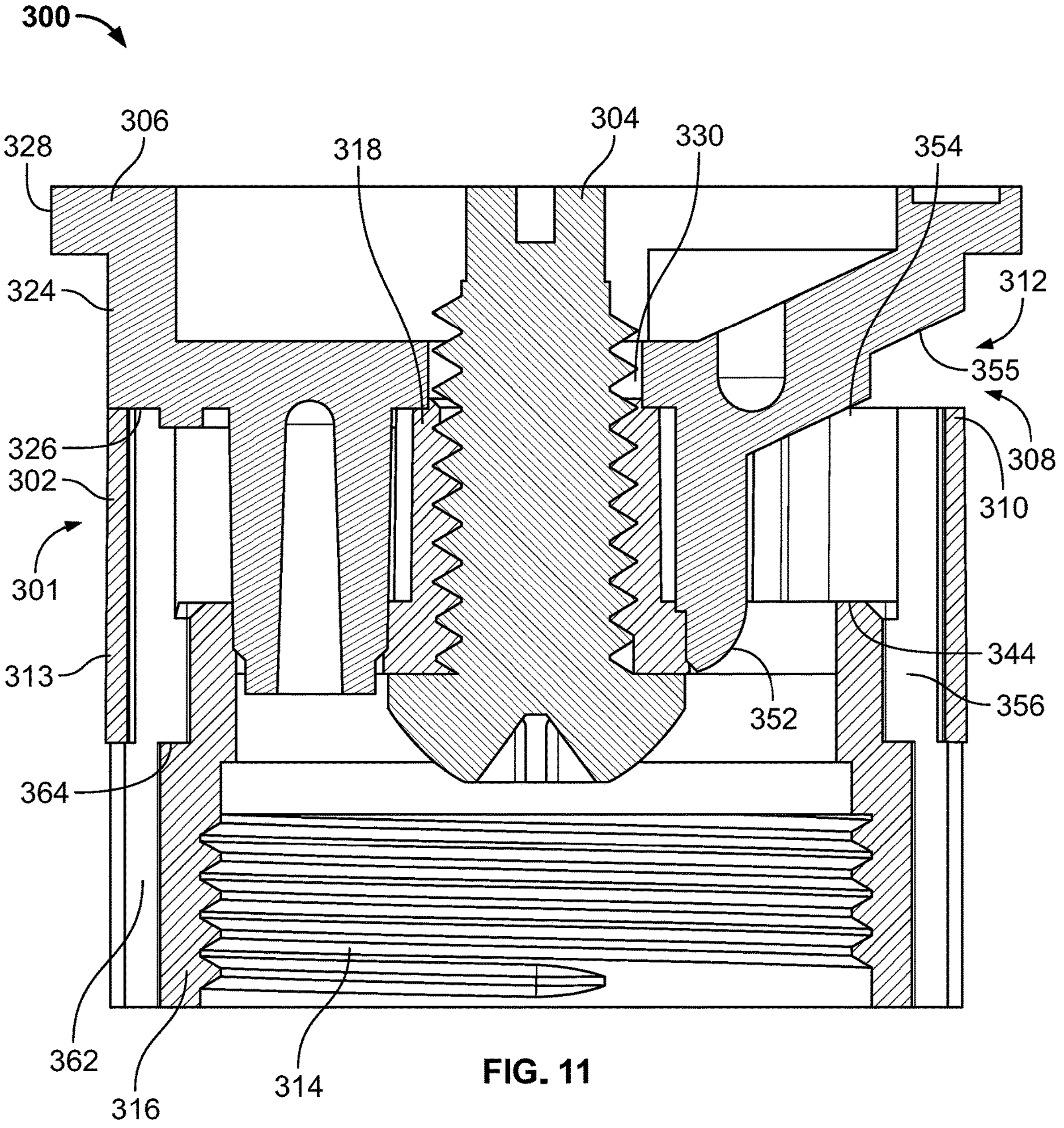
FIG. 11 is a cross-sectional view of the fixed deflector nozzle of FIG. 10.
Figure 12:
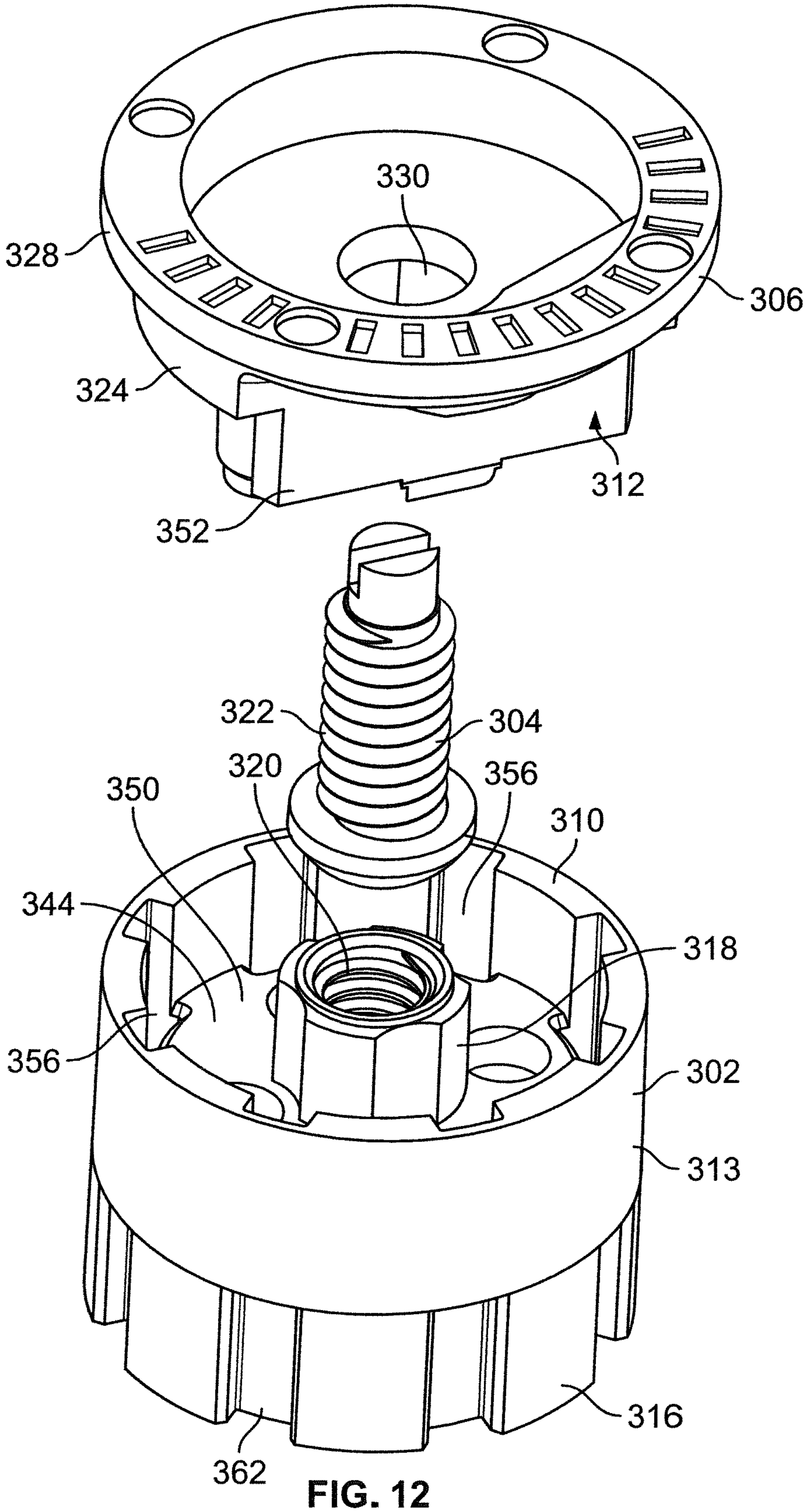
FIG. 12 is a top exploded perspective view of the fixed deflector nozzle of FIG. 10.
Figure 13:
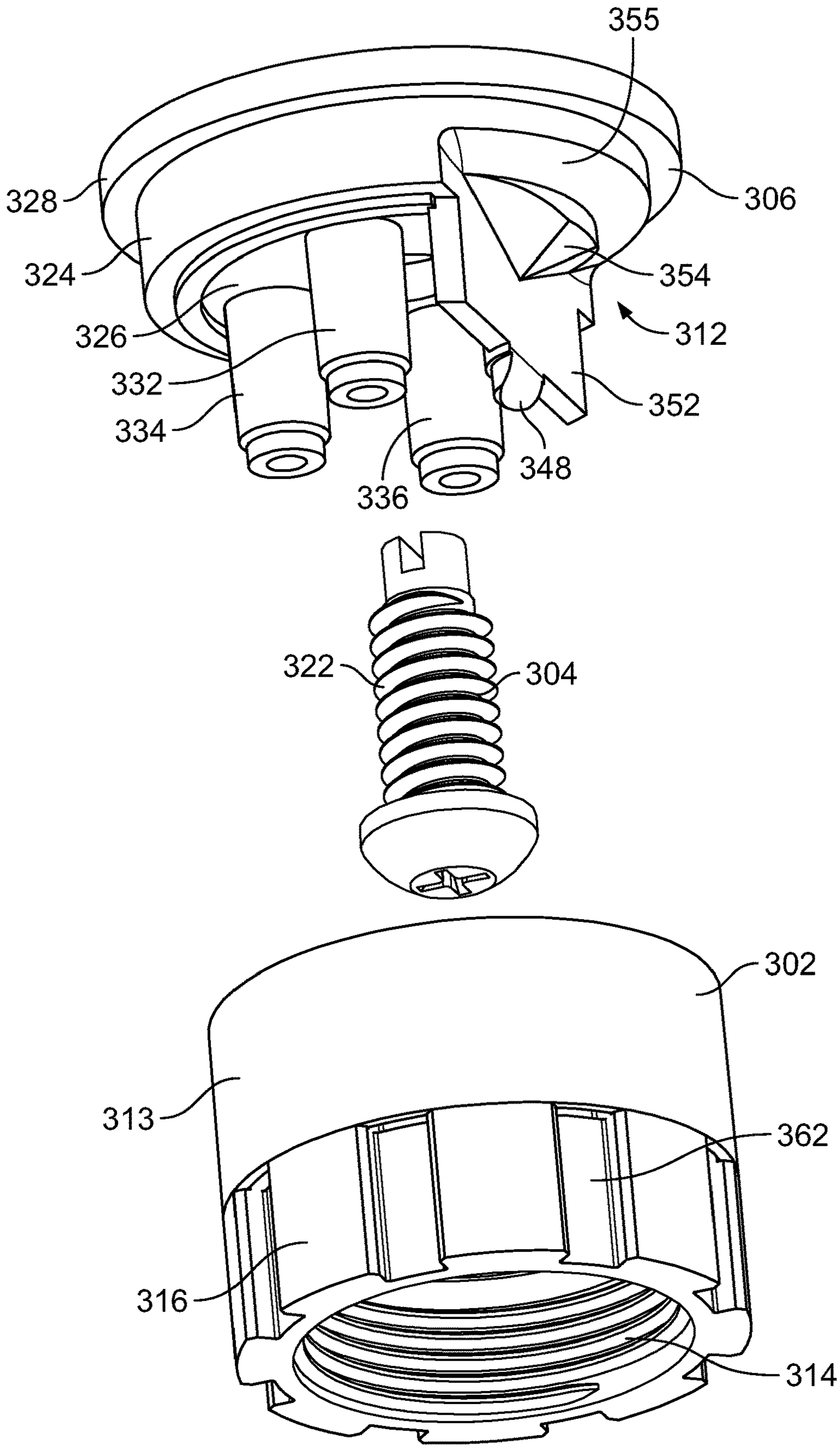
FIG. 13 is a bottom exploded perspective view of the fixed deflector nozzle of FIG. 10.

As best seen in FIGS. 11 and 13, in this preferred form, the base 302 is formed as a cylindrical member with an outer cylindrical wall 313 and also having internal threads 314 formed around a lower skirt portion 316 that are adapted to mate with corresponding external threads formed around the upper end portion of a riser (or fluid source). The lower skirt portion 316 defines the inlet of the nozzle body 301. The base 302 further includes a plate 344 (dividing upper and lower portions of the base 302) and an upwardly projecting central hollow cylindrical post 318. The internal surface of the post 318 is formed with threads 320 which are adapted to mate with external threads 322 formed about the shank of the throttling screw 304.

The deflector 306 overlies the upper end of the base 302. In this preferred form, the deflector 306 is also generally cylindrical in shape and includes a vertical cylindrical wall portion 324 having an outer surface diameter substantially the same as that of the outer cylindrical wall 313 of the base 302, a generally horizontal bottom wall 326, and a radially enlarged peripheral flange portion 328 projecting outwardly around the upper end of the wall portion 324. A central opening 330 is formed through the bottom wall 326 of the deflector 306, and which is dimensioned to permit the upper end portion of the throttling screw 304 to project therethrough for adjustment thereof.

Figure 14:
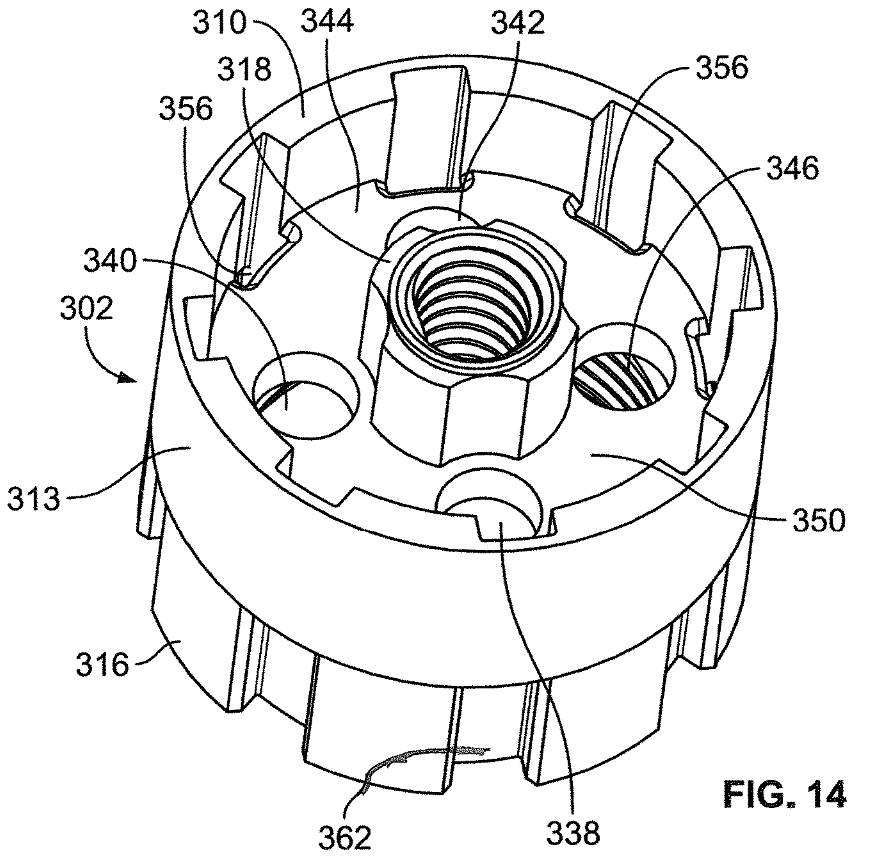
FIG. 14 is a perspective view of the nozzle base of the fixed deflector nozzle of FIG. 10.

With reference to FIGS. 13 and 14, disposed to project downwardly from the underside of the bottom wall 326 of the deflector 306 are three equally spaced elongated cylindrical pins 332, 334, and 336, which are dimensioned and positioned to frictionally mate within the three equally spaced holes 338, 340, and 342, through the plate 344 of the base 302. The pins 332, 334, and 336 and holes 338, 340, and 342 are preferably spaced at arcuate locations about the deflector 306, and base 302, respectively. The pins 332, 334, and 336 and holes 338, 340, and 342 serve to locate and mount the deflector 306 to the base 302. The fourth hole 346 functions to provide a controlled opening through the base 302 for the flow of water to the outlet 308. As can be seen from FIG. 13, a portion of a fourth pin 348 extends into (but does not fully obstruct) the fourth hole 346.

In this latter respect, it will be noted that in the partial-circle embodiment of FIGS. 10-16, the fourth hole 346 defines an internal flow passage in the central hub 350 of the nozzle body 301. This fourth hole 346 leads to the deflector recess 312 formed in the deflector 306, which generally defines the pattern template of the nozzle body 301. As can be seen, the deflector recess 312 is formed by a vertical wall 352, one or more surfaces 354 formed in the underside of the deflector 306, and a generally flat deflector top portion 355 that is inclined upwardly and radially outwardly. It should be noted that the precise shape of the deflector recess 312 can take various forms appropriate for the precipitation rate, distribution, and pattern desired.

During operation, water flows upwardly through the interior of the nozzle body 301 and then radially outwardly. More specifically, it flows through the inlet defined by the lower skirt portion 316, through the internal flow passage defined by the fourth hole 346, impacts the underside of the deflector 306, and is then directed radially outwardly through the outlet 308.

Figure 15:
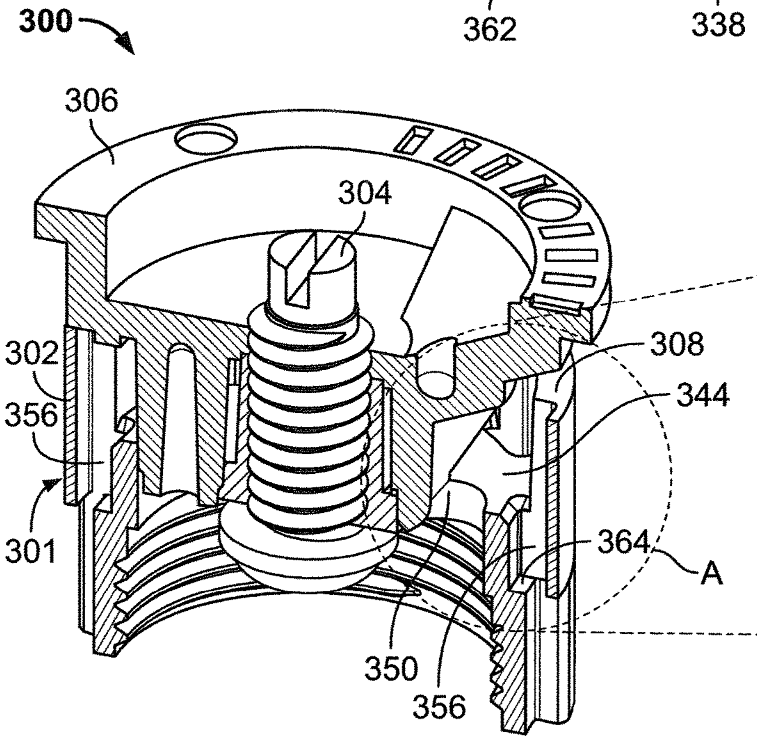
FIG. 15 is a partial cross-sectional view of the fixed deflector nozzle of FIG. 10.
Figure 16:
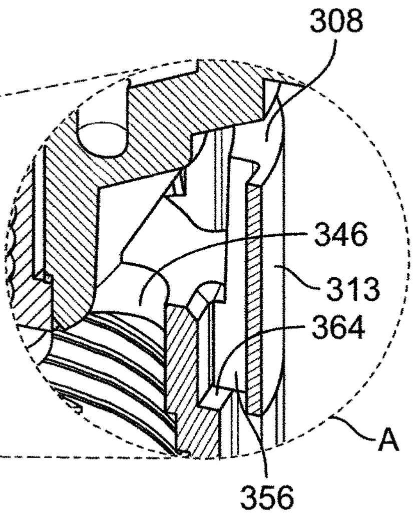
FIG. 16 is an enlarged view of the detail portion A of FIG. 15.

FIGS. 14-16 show the grit diversion feature in nozzle 300. This feature generally includes grit vents 356 in the form of outer flow passages disposed in the outer cylindrical wall 313 of the base 302 and defining grit flow paths away from the internal flow channel/fourth hole 346 in the central hub 350. More specifically, the grit vents 356 are in the form of slots defined by recesses in the outer cylindrical wall 313 and/or the plate 344 of the base 302. The lower skirt portion 316 preferably includes an indented portion 362 for each grit vent 356 to further guide the grit and debris away from the nozzle 300. In this preferred form, there is a step 364 between each grit vent 356 and its corresponding indented portion 362. Further, in this preferred form, there are eight grit vents 356 spaced equally and circumferentially along the outer cylindrical wall 313 about the base 302, although it should be understood that a different number and arrangement of grit vents is possible.

The grit vents 356 are disposed radially outwardly from the central hub 350 where there are flow channels that are to be protected from grit and debris. The grit vents 356 and grit flow paths therefore redirect grit and debris radially outwardly and downward away from the flow channels in the interior of the nozzle. Further, it is believed the grit vents 356 help prevent grit and debris from accumulating on the plate 344. Instead, during operation, any grit or debris tending to accumulate on the plate 344 is generally flushed through the grit vents 356.

Accordingly, there is disclosed a nozzle comprising: a nozzle body defining an inlet and an outlet, the inlet configured to received fluid from a source and the outlet configured to deliver fluid out of the nozzle body; a central hub in the nozzle body including at least one flow channel through, at least, a portion of the nozzle body; a pattern template in the nozzle body defining a pattern of coverage for distribution of fluid from the nozzle body; and wherein the nozzle body includes a grit vent disposed radially outwardly from the central hub, the grit vent configured to divert debris away from the nozzle body.

In some implementations, in the nozzle, the pattern template may include a first body and a second body configured to engage one another to define the pattern of coverage; and the second body may include the central hub and the first body may be configured for nested insertion within the central hub of the second body. In some implementations, the second body may include the grit vent. In some implementations, the nozzle may further include a deflector downstream of the outlet and having an underside surface contoured to deliver fluid radially outwardly from the deflector, the outlet of the nozzle body oriented to direct fluid against the underside surface. In some implementations, the second body may further include an inner wall disposed about the central hub and configured to limit debris from flowing into the central hub. In some implementations, the inner wall may be a predetermined height, the predetermined height selected so that at least a portion of fluid exiting the nozzle body is not directed at the inner wall. In some implementations, the inner wall may be a predetermined height, the predetermined height selected so that the inner wall does not engage the deflector. In some implementations, the inner wall may be annular in cross-section. In some implementations, the first body and second body may define the at least one flow channel, the inner wall configured to limit debris from flowing into the at least one flow channel. In some implementations, the second body may include: an intermediate wall defining the grit vent therethrough; and a floor connecting the inner wall and the intermediate wall; a grit path defined, at least in part, by the floor, the inner wall, and the intermediate wall cooperating to direct debris away from the inner wall and through the grit vent. In some implementations, the nozzle may further include a rotatable nozzle collar configured for adjusting flow through the nozzle, the nozzle collar comprising a top portion with an external surface accessible for rotation by a user to adjust the flow. In some implementations, the rotatable nozzle collar may further include: a bore extending axially through the nozzle collar; and an internal engagement surface configured for engagement with a throttle control member for axial movement of the throttle control member in the bore of the nozzle collar. In some implementations, the second body may further include an outer wall defining a window therethrough, the window in fluid communication with the grit vent and configured to provide access to the external surface of the nozzle collar for rotation by the user. In some implementations, the window may be a first predetermined height and the external surface of the nozzle collar is a second predetermined height, the first predetermined height being greater than the second predetermined height and defining the height of the grit vent. In some implementations, the nozzle collar may be disposed entirely upstream of the grit vent. In some implementations, the nozzle body may include two grit vents and an upstanding support member separating the two grit vents. In some implementations, the intermediate and outer walls are part of a single, unitary wall. In some implementations, the nozzle body includes a plurality of grit vents, each grit vent disposed in an outer cylindrical wall of the nozzle body and spaced circumferentially from one another about the outer cylindrical wall.

It will be understood that various changes in the details, materials, and arrangements of parts and components which have been herein described and illustrated in order to explain the nature of the nozzle may be made by those skilled in the art within the principle and scope of the subject matter as expressed in the appended claims. Furthermore, while various features have been described with regard to a particular embodiment or a particular approach, it will be appreciated that features described for one embodiment also may be incorporated with the other described embodiments.

What is claimed is:

1. A nozzle comprising:

a nozzle base defining an inlet configured to receive fluid from a source, the nozzle base comprising a wall defining an interior, the nozzle base comprising an upstream portion and a downstream portion;

a deflector mounted to the nozzle base, the deflector and the nozzle base cooperating to define an outlet configured to deliver fluid out of the nozzle;

a first flow channel between the inlet and the outlet, the outlet defining a predetermined pattern of coverage for distribution of fluid from the nozzle;

a grit vent comprising a second flow channel defined, at least in part, by the wall of the nozzle base, the grit vent configured to divert debris away from the interior of the nozzle base, the second flow channel comprising a first elongated channel segment formed in one of the upstream and downstream portions and defining an entrance of the second flow channel and comprising a second elongated channel segment formed in the other of the upstream and downstream portions and defining an exit of the second flow channel, the first elongated channel segment and the second elongated channel segment separated by an orifice;

a first flow path from the inlet, through the first flow channel, and through the outlet; and a second flow path through the grit vent and away from the interior of the nozzle base;

wherein the nozzle base has a central axis perpendicular to the inlet, and the second elongated channel segment extends in a direction parallel to the central axis and downstream of the orifice.

2. The nozzle of claim 1 further comprising a throttling screw configured to adjust flow through the nozzle, the throttling screw extending through an opening in the nozzle base and an opening in the deflector.

3. The nozzle of claim 1, wherein the deflector further comprises a plurality of pins configured to be received in a plurality of holes in the nozzle base to mount the deflector to the nozzle base.

4. The nozzle of claim 3, wherein one of the plurality of pins is not fully received within a corresponding hole, the one pin and an unobstructed portion of the corresponding hole defining the first flow channel.

5. The nozzle of claim 1, wherein the deflector comprises a wall having a shape corresponding to and defining the predetermined pattern of coverage.

6. The nozzle of claim 1, wherein the deflector comprises a surface upstream of the outlet configured to determine a spray pattern as fluid exits the outlet.

7. The nozzle of claim 1, wherein the deflector is fixed against rotation relative to the nozzle base.

8. The nozzle of claim 1, wherein the wall of the nozzle base is cylindrical in shape and the second flow channel of the grit vent is formed in the wall.

9. The nozzle of claim 8, wherein the nozzle base includes a plate separating the inlet and the outlet, the plate cooperating with the wall to define the second flow channel of the grit vent.

10. The nozzle of claim 1, wherein the wall of the nozzle base comprises a skirt portion defining the inlet, the skirt portion including an indented wall portion corresponding to the grit vent to guide grit away from the nozzle.

11. The nozzle of claim 1, further comprising a plurality of grit vents spaced circumferentially and equidistantly about the wall of the nozzle base.

12. The nozzle of claim 1, wherein the first elongated channel segment opens radially inwardly and the second elongated channel segment opens radially outwardly.

13. A nozzle comprising:

a nozzle body comprising an inlet, an outlet, and a wall defining an interior, the inlet configured to receive fluid from a source and the outlet configured to deliver fluid out of the nozzle body, the nozzle body comprising an upstream portion and a downstream portion;

a first flow channel in the interior of the nozzle body between the inlet to the outlet, the outlet defining a predetermined pattern of coverage for distribution of fluid from the nozzle body;

a grit vent comprising a second flow channel defined, at least in part, by the wall of the nozzle body, the grit vent configured to divert debris away from the interior of the nozzle body, the second flow channel comprising a first elongated channel segment formed in one of the upstream and downstream portions and defining an entrance of the second flow channel and comprising a second elongated channel segment formed in the other of the upstream and downstream portions and defining an exit of the second flow channel, the first elongated channel segment and the second elongated channel segment separated by an orifice;

a first flow path from the inlet, through the first flow channel, and through the outlet; and a second flow path through the grit vent and away from the interior of the nozzle body;

wherein the nozzle body has a central axis perpendicular to the inlet, and the second elongated channel segment extends in a direction parallel to the central axis and downstream of the orifice.

14. The nozzle of claim 13, wherein the wall of the nozzle body is cylindrical in shape and the second flow channel of the grit vent is formed in the wall.

15. The nozzle of claim 14, wherein the grit vent is disposed radially outwardly from the first flow channel and configured to divert grit away from the first flow channel.

16. The nozzle of claim 15, wherein the nozzle body includes a plate separating the inlet and the outlet, the plate cooperating with the wall to define the second flow channel of the grit vent.

17. The nozzle of claim 13, wherein the wall of the nozzle body comprises a skirt portion defining the inlet, the skirt portion including an indented wall portion corresponding to the grit vent to guide grit away from the nozzle.

18. The nozzle of claim 13, wherein the grit vent comprises a slot in the wall of the nozzle body.

19. The nozzle of claim 13, wherein the second flow path directs grit away from the first flow channel.

20. The nozzle of claim 13, further comprising a plurality of grit vents spaced circumferentially and equidistantly about the wall of the nozzle body.

21. The nozzle of claim 13, wherein the nozzle body is formed of a plurality of component parts.

22. A nozzle comprising:

a nozzle base defining an inlet configured to receive fluid from a source, the nozzle base comprising a wall defining an interior, the nozzle base comprising an upstream portion and a downstream portion;

a deflector mounted to the nozzle base, the deflector and the nozzle base cooperating to define an outlet configured to deliver fluid out of the nozzle;

a first flow channel between the inlet and the outlet, the outlet defining a predetermined pattern of coverage for distribution of fluid from the nozzle;

a grit vent comprising a second flow channel defined, at least in part, by the wall of the nozzle base, the grit vent configured to divert debris away from the interior of the nozzle base, the second flow channel comprising a first channel segment opening radially inwardly formed in one of the upstream and downstream portions and defining an entrance of the second flow channel and comprising a second channel segment opening radially outwardly formed in the other of the upstream and downstream portions and defining an exit of the second flow channel;

a first flow path from the inlet, through the first flow channel, and through the outlet; and a second flow path through the grit vent and away from the interior of the nozzle base.

23. The nozzle of claim 22, wherein the first channel segment is open on one side with its open side facing inwardly and the second channel segment is open on one side with its open side facing outwardly.

* * * * *